United States Patent
Takada et al.

(10) Patent No.: US 9,209,942 B2
(45) Date of Patent: Dec. 8, 2015

(54) COMMUNICATION SYSTEM AND COMMUNICATION APPARATUS

(75) Inventors: Hiroaki Takada, Nagoya (JP); Ryo Kurachi, Nagoya (JP); Masanobu Nishimura, Yokkaichi (JP); Satoshi Horihata, Yokkaichi (JP)

(73) Assignees: NATIONAL UNIVERSITY CORPORATION NAGOYA UNIVERSITY, Nagoya (JP); AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 21 days.

(21) Appl. No.: 13/813,749
(22) PCT Filed: Aug. 9, 2011
(86) PCT No.: PCT/JP2011/068168
§ 371 (c)(1), (2), (4) Date: Feb. 1, 2013
(87) PCT Pub. No.: WO2012/020761
PCT Pub. Date: Feb. 16, 2012

(65) Prior Publication Data
US 2013/0139018 A1 May 30, 2013

(30) Foreign Application Priority Data
Aug. 9, 2010 (JP) .................................. 2010-178681

(51) Int. Cl.
H04L 12/26 (2006.01)
H04L 1/08 (2006.01)
(Continued)

(52) U.S. Cl.
CPC ................ *H04L 1/08* (2013.01); *H04L 1/1607* (2013.01); *H04L 12/407* (2013.01); *H04L 12/417* (2013.01); *H04L 1/0061* (2013.01); *H04L 1/1867* (2013.01); *H04L 2001/0094* (2013.01)

(58) Field of Classification Search
USPC ......... 370/347, 348, 349, 350, 389, 394, 392, 370/395.1, 395.3, 432, 471, 242, 312, 328, 370/324, 235; 714/748
See application file for complete search history.

(56) References Cited

U.S. PATENT DOCUMENTS

| 5,537,414 A * | 7/1996 | Takiyasu et al. .............. 370/347 |
| 2006/0165047 A1* | 7/2006 | Kodama et al. ................ 370/350 |

(Continued)

FOREIGN PATENT DOCUMENTS

| JP | A-2004-363761 | 12/2004 |
| JP | 2005333584 A | 12/2005 |

(Continued)

OTHER PUBLICATIONS

"ISO 11898-1: Road vehicles—Controller area network (CAN)—Part 1: Data link layer and physical signalling," Dec. 1, 2003.

(Continued)

*Primary Examiner* — Chi H Pham
*Assistant Examiner* — Alexander O Boakye
(74) *Attorney, Agent, or Firm* — Oliff PLC

(57) ABSTRACT

In a network in which a plurality of ECUs are connected to one another with a common bus, one or more slots are allocated to each ECU in advance, and the plurality of ECUs cyclically transmit messages in an order prescribed in relation to the slots. When each ECU transmits the message related to one slot, each ECU creates and transmits a message including data to be transmitted to other ECUs, and information representing respectively a success/failure of the message reception related to other slots. Each ECU checks information of ACK field included in a message received during one cycle from message transmission related to one slot to a next message transmission related to said one slot. When the message related to one slot is not accurately received by the other ECUs, retransmits the message in the next transmission related to said one slot.

12 Claims, 34 Drawing Sheets

(51) Int. Cl.
  *H04L 12/407* (2006.01)
  *H04L 12/417* (2006.01)
  *H04L 1/16* (2006.01)
  *H04L 1/00* (2006.01)
  *H04L 1/18* (2006.01)

(56) References Cited

U.S. PATENT DOCUMENTS

| 2009/0327549 A1 | 12/2009 | Fuehrer |
| 2010/0118698 A1 | 5/2010 | Yokobori et al. |
| 2010/0278087 A1 | 11/2010 | Kawakami et al. |

FOREIGN PATENT DOCUMENTS

| JP | 2007081628 A | 3/2007 |
| JP | A-2008-048365 | 2/2008 |
| JP | A-2009-038585 | 2/2009 |
| JP | A-2009-038588 | 2/2009 |
| JP | A-2009-038661 | 2/2009 |
| JP | A-2009-038663 | 2/2009 |
| JP | 2009521152 A | 5/2009 |
| JP | A-2010-081152 | 4/2010 |
| WO | WO 2009/016818 A1 | 2/2009 |

OTHER PUBLICATIONS

"ISO 11519-1: Road vehicles—Low-speed serial data communication—Part 1: General and Definitions," Jun. 15, 1994.

Kurachi et al., "Development of Scalable CAN Protocol," *SEI Technical Review*, No. 177, pp. 30-35, Jul. 31, 2010 (With Translation).

International Search Report issued in Application No. PCT/JP2011/068168; Dated Sep. 13, 2011 (With Translation).

\* cited by examiner

FIG. 9

| SIGNAL NAME | SIGNAL DEFINITION |
|---|---|
| Sample_clock | OPERATION CLOCK WITHIN ECU |
| Sample_point | SAMPLING POINT OF RECEIVED MESSAGE |
| Slot_bit_cnt | BIT COUNTER<br>SLOT COUNTER IS COUNTED UP WHEN BIT COUNTER EXCEEDS PREDETERMINED VALUE |
| Slot_cnt_ena | SIGNAL FOR CONTROLLING WHETHER OR NOT SLOT COUNTER MAY BE COUNTED UP |
| Slot_cnt | SLOT COUNTER |
| Slot_cnt_point | REPRESENT TIME WHEN SLOT COUNTER IS COUNTED UP |
| Slot_acpoint | REPRESENT STARTING POINT OF MESSAGE TRANSMISSION RERATED TO SLOT |
| Slot_wrcnt | SLOT NUMBER INCLUDED IN NORMALLY RECEIVED MESSAGE AND THE LIKE INFORMATION FROM PROTOCOL CONTROL MEANS |
| Slot_wrcnt_cmd | WRITING INSTRUCTION OF SLOT NUMBER DESIGNATED AT Slot_wrcnt |

FIG. 14

| TYPE OF ERROR | CONTENT OF ERROR | DETECTING OBJECT |
|---|---|---|
| STAFF ERROR | ERROR DETECTED WHEN SAME SIGNAL LEVEL IS 6 BIT CONTINUOUS IN FIELD WHERE BIT STAFF IS SUPPOSED TO BE PERFORMED | FROM SOF TO CRC SEQUENCE |
| CRC ERROR | ERROR DETECTED WHEN VALUE OF CRC SEQUENCE INCLUDED IN RECEIVED MESSAGE IS DIFFERENT FROM VALUE OF CRC SEQUENCE CALCULATED FROM RECEIVED MESSAGE | CRC SEQUENCE |
| FORM ERROR | ERROR DETECTED WHEN VALUE OF BIT FIELD WHICH IS TO BE FIXED IS DEFERENT FROM FIXED VALUE | CRC DELIMITER, EOF |
| ACK ERROR | ERROR DETECTED WHEN ANY ONE BIT INCLUDED IN ACK FIELD IS SET AS NAK | ACK FIELD |
| BIT ERROR | ERROR DETECTED WHEN LEVEL OUTPUT TO BUS DOES NOT COINCIDE WITH LEVEL OF BUS FROM COMPARISON RESULT OF THESE TWO LEVEL (EXISTING CAN PROTOCOL) | UNSUPPORTED |

FIG. 15

FLUCTUATION CONDITION OF ERROR COUNTER

| FLUCTUATION CONDITION OF ERROR COUNTER | TRANSMIT ERROR COUNTER (TEC) | RECEIVE ERROR COUNTER (REC) |
|---|---|---|
| DETECTING FORM ERROR<br>DETECTING CRC ERROR<br>DETECTING STAFF ERROR | — | +1 |
| THE CASE WHERE MESSAGE DETERMINED AS NAK BY OWN APPARATUS IS DETERMINED AS ACK BY OTHER APPARATUSES | — | +8 |
| THE CASE WHERE OWN APPARATUS RECEIVES NAK FROM ALL THE OTHER APPARATUSES | +8 | — |
| THE CASE WHERE MESSAGE TRANSMISSION IS SUCCEEDED | −1<br>(HOWEVER, WHEN TEC = 0, THERE IS NO FLUCTUATION) | — |
| THE CASE WHERE MESSAGE RECEPTION IS SUCCEEDED | — | −1 WHEN 1 ≤ REC ≤ 127<br>NO FLUCTUATION WHEN REC = 0<br>SET VALUE OF REC TO 119 TO 127 WHEN REC > 127 |
| RETURNING FROM BUS OFF STATE | CLEAR VALUE OF TEC TO ZERO | CLEAR VALUE OF REC TO ZERO |

FIG. 32

| SOF | ID FIELD | CONTROL FIELD | SLEEP | EA | ACK FIELD | SLOT | CRC | DATA FIELD | CRC FIELD | EOF |

COMMUNICATION SYSTEM AND COMMUNICATION APPARATUS

This application is the national stage under 35 U.S.C. §371 of PCT International Application No. PCT/JP2011/068168 which has an International filing date of Aug. 9, 2011 and designated the United States of America.

FIELD

The present invention relates to a communication system in which a plurality of communication apparatuses such as an electronic control unit (ECU) mounted in a vehicle transmit and receive data via a common communication line (a bus) and the communication apparatus.

BACKGROUND

In the related art, a plurality of electronic devices performing various types of processing are mounted in a vehicle. For controlling an operation of these electronic devices, a plurality of ECUs are mounted in a vehicle. Further, in order for the plurality of ECUs to be operated in cooperation with one another, each ECU is connected with each other via a network and the plurality of ECUs share information through the transmission and reception of data. In this case, as communication protocols, a controller area network (CAN) (see ISO 11898-1: 2003 Road vehicles—Controller area network (CAN)—Part1: Data link layer and physical signaling, ISO 11519-1: 1994 Road vehicles—Low-speed serial data communication—Part1: General and definitions) has been widely adopted.

In the CAN protocol, the plurality of ECUs are connected with a bus formed of a twisted pair cable that transmits operating signals and each ECU transmits and receives digital data represented by the operating signals. Further, the CAN is a protocol of serial communication and only one ECU of the plurality of ECUs that are connected with the CAN bus can transmit data and other ECUs are controlled to stand by until one ECU ends the transmission of data. In addition, when the plurality of ECUs transmit data simultaneously, the plurality of ECUs perform an arbitration based on IDs allocated to the data and are controlled so as to transmit data having high priority.

DISCLOSURE OF THE INVENTION

Problems to be Solved by the Invention

SUMMARY

Recently, according to the high level of electronic control performed in modern vehicles, a demand for high-function ECUs mounted in vehicles has increased, and the data amount transmitted and received among the ECUs and the generation frequency of the transmission and reception among the ECUs have increased. Therefore, sufficient data cannot be transmitted and received at a communication rate (about 1 Mbps) of the communication system according to an existing CAN protocol and communication capacity of the current communication system for a vehicle has reached its limit.

Meanwhile, as communication protocols for achieving a high communication rate, protocols such as FlexRay have been proposed. The high-rate communications can be achieved by adopting other such protocols, but changing the existing overall communication system from the CAN protocol to other protocols imposes a great burden on the development costs of apparatuses, the reliability of systems and the like.

Therefore, there is a need to create a mechanism capable of allowing a slow transition from applications in which high-rate communications are required to high-rate upper protocols compatible with the CAN protocol, as compared with communication systems based on the existing CAN protocol. The problems relating to the development costs, reliability and the like can be overcome as much as possible by creation of such a mechanism.

In the existing CAN protocol, as factors limiting the improvement in communication rate, it may take processing time required to perform arbitration processing (hereinafter referred to as "arbitration") that is performed when the plurality of ECUs transmit data simultaneously. For example, in order to perform the arbitration, each communication apparatus outputs a signal related to its own transmitting data to a bus, and then detects whether or not signals on the bus are changed due to a collision of signals that are output from other communication apparatuses. However, there is a need to detect signals after some standby time, in consideration of situations such as propagation delay of signals output from other communication apparatuses. In this case, the standby time is a factor of hindering the improvement in communication rate.

In consideration of the above-mentioned circumstances, it is an object of the present invention to provide a communication system enabling a plurality of communication apparatuses connected with a bus to transmit and receive data at high speed by solving limiting factors related to speed improvement such as processing time of arbitration, based on a CAN protocol and the communication apparatus.

According to an aspect of the present invention, there is provided a communication system in which a plurality of communication apparatuses are connected with a common communication line and a message transmitted by one communication apparatus among the plurality of communication apparatuses is received by other communication apparatuses, wherein one or more transmission rights are allocated to each communication apparatus in advance and the plurality of communication apparatuses cyclically transmit messages in an order prescribed in relation to the allocated transmission rights, and each communication apparatus includes: message transmitting means for creating and transmitting a message including a plurality of success/failure information of reception, each of which represents a success/failure of message reception related to each transmission right, and data to be transmitted to another communication apparatus; and message retransmitting means for retransmitting a message according to the success/failure information of reception included in the message received from another communication apparatus.

In the communication system according to the present invention, the message transmitting means of each communication apparatus adds in a message to be transmitted, a success/failure of reception of message related to another transmission right and transmitted during one cycle from one message transmission related to one transmission right of the message transmitting means to the next message transmission related to said one transmission right as the success/failure information of reception.

In addition, in the communication system according to the present invention, each communication apparatus transmits or receives, when a message related to one communication right is not transmitted for a predetermined time, a message related to the next communication right.

Further, in the communication system according to the present invention, the message transmitting means of each communication apparatus creates and transmits a message including identification information for identifying the transmission right, and each communication apparatus synchronizes message transmission and reception on the basis of the identification information of the received message.

Further, in the communication system according to the present invention, the message transmitting means of each communication apparatus creates and transmits a message including information for detecting or correcting an error of the identification information.

Further, in the communication system according to the present invention, each communication apparatus includes an error counter counting the occurrence number of errors related to message transmission and reception, and the message transmitting means of each communication apparatus reduces a frequency of message transmission when the occurrence number of errors counted by the error counter exceeds a predetermined value.

Further, in the communication system according to the present invention, each communication apparatus does not transmit a message during a predetermined cycle after waking up, and each communication apparatus includes communication starting means for starting message transmission and reception to and from another communication apparatus by: transmitting, when a message is received from another communication apparatus during the predetermined cycle after waking up, the next message in synchronization with the received message; and transmitting a message when a message is not received from another communication apparatus during the predetermined cycle after waking up.

Further, in the communication system according to the present invention, each communication apparatus includes time measuring means for measuring a standby time up to message transmission, the communication starting means of each communication apparatus transmits a message after the standby time according to the allocated transmission right is measured by the time measuring means, when the communication starting means transmits a message or when the communication apparatus receives an abnormal message from another communication apparatus during the predetermined cycle, and the plurality of communication apparatuses measure different standby times using the time measuring means, respectively.

Further, in the communication system according to the present invention, each communication apparatus includes: time measuring means for measuring a standby time up to message transmission; and communication resuming means for resuming message transmission after the standby time according to the allocated transmission right is measured by the time measuring means when a message is not received from another communication apparatus during a predetermined cycle, and the plurality of communication apparatuses measure different standby times using the time measuring means, respectively.

Further, in the communication system according to the present invention, each communication apparatus includes: communication stop request transmitting means for transmitting a message for requesting a stop of message transmission; communication stop request receiving means for receiving a message for requesting a stop of communication processing from another communication apparatus; and communication stop control means for stopping message transmission when the communication stop request receiving means receives the message for requesting the stop of the communication processing from other communication apparatuses during a predetermined cycle.

According to another aspect of the present invention, there is provided a communication apparatus for transmitting and receiving a message to and from another apparatus via a common communication line, wherein one or more transmission rights are allocated to the communication apparatus in advance, and the communication apparatus includes: message transmitting means for creating and transmitting a message including a plurality of success/failure information of reception, each of which represents a success/failure of message reception related to each of transmission rights including a transmission right allocated to another communication apparatus, and data to be transmitted to another apparatus; and message retransmitting means for retransmitting a message according to the success/failure information of reception included in the message received from another apparatus.

According to the present invention, in the network configuration in which the plurality of communication apparatuses are connected with the common communication line (the bus), one or more transmission rights (hereinafter, referred to as a "slot") are allocated to each communication apparatus in advance and each communication apparatus cyclically transmits messages in a prescribed order as related to their own slots. Therefore, the plurality of communication apparatuses transmit data by using the bus in a prescribed order in a time division manner, such that the plurality of communication apparatus do not need to transmit data simultaneously and perform the arbitration, as in the existing CAN protocol. Accordingly, it is possible to remove the time restrictions required to perform the arbitration and achieve high-rate communication.

Alternatively, when each communication apparatus transmits messages related to one slot, each communication apparatus creates and transmits a message including a plurality of success/failure information of reception, each of which represents the success/failure of the message reception related to other slots, respectively, and data to be transmitted to another communication apparatus. Meanwhile, when no data to be transmitted to another communication apparatus are present, each communication apparatus may create and transmit messages not including data and including the success/failure information of reception. Each communication apparatus transmits a message including the success/failure information of reception and data, such that each communication apparatus may validly use a slot allocated thereto, thereby informing another communication apparatus of the success/failure of the message reception and providing data included in each communication apparatus to another communication apparatus.

A message transmitted from one communication apparatus is received by all the other communication apparatuses that are connected with a bus. Each communication apparatus receiving a message can acquire data included in the message and can determine whether or not the messages previously transmitted by each communication apparatus are accurately received on the basis of the success/failure information of reception included in the message. Therefore, each communication apparatus checks the success/failure information of reception included in a message that is received for one cycle, from one message transmission related to one slot to the next message transmission related to the same slot, and in the case where a message transmitted at one transmission opportunity related to one slot is not accurately received, each communication apparatus can retransmit the message at the next transmission opportunity related to the same slot.

Therefore, the arbitration as in the existing CAN protocol is not performed, such that a collision of messages may not occur at the time of transmitting the messages and the plurality of communication apparatuses may efficiently and cyclically transmit messages. Even when the messages are not accurately received due to any problem, it is possible to correctly retransmit the messages.

Further, according to the present invention, the message created by each communication apparatus includes, as the success/failure information of reception, a success/failure of reception of a message related to another slot and transmitted and received during one cycle, from one message transmission related to one transmission right to the next message transmission related to said one transmission right. That is, the message includes the success/failure information of reception that corresponds to a total number of slots of the communication system as information that corresponds to one cycle (however, each communication apparatus may not add in a message, the success/failure information of reception relating to its own slot and, in this case, the information related to slots, the number of which is obtained by subtracting one from the total number of slots is included in the message). As described above, each communication apparatus can know whether or not all the other communication apparatuses sharing a bus accurately receive the message transmitted by said each communication apparatus, since each communication apparatus transmits the success/failure information of reception in one cycle to all the other communication apparatuses and receives the success/failure information of reception transmitted from the other communication apparatuses during one cycle.

Further, according to the present invention, when the message related to one slot is reached in a transmitted order, and then the messages related to this slot are not transmitted, it is assumed that the processing for the communication apparatus to which this slot is allocated has stopped for some reason (for example, problems such as failure, sleep mode or the like). Therefore, when a message related to one slot is not transmitted for a predetermined time, each communication apparatus omits the transmission and reception processing of a message related to this slot and processes the transmission and reception of the messages related to a next slot. As a result, it may contribute to the reduction in a period of time when the messages are not transmitted and received as much as possible and the achievement of the high communication rate. In addition, even when a reserved slot is provided in order to optionally add equipment to the communication system, the processing related to the reserved slot may be omitted in the state in which the optional equipment is not added.

Further, according to the present invention, the message created by each communication apparatus includes identification information (for example, slot number) for identifying a slot. In order for the plurality of communication apparatuses participating in the present communication system to share the bus in a time division manner, the communication apparatuses need to detect which one of the slots is used on the bus and to transmit messages in synchronization with one another. As a result, each communication apparatus synchronizes the processings related to the transmission and reception of the messages so as to meet a receiving timing of a slot number included in the received messages. By doing so, the plurality of communication apparatuses can perform the processings in synchronization with one another and can correctly transmit and receive a message.

Further, according to the present invention, the message created by each communication apparatus includes the identification information such as the slot number, and information for detecting or correcting an error of this identification information. Even in the existing CAN protocol, the information (cyclic redundancy check (CRC) sequence) for detecting an error of whole message is included in the message, and aside from this, the information for detecting or correcting an error of only the slot number and the like is included in the message. In the present communication system, the plurality of communication apparatuses cyclically transmit messages using the bus in a time division manner. Therefore, determining which one of the slots is related to the transmitted message is the important processing. In the case where an error occurs in the identification information such as the slot number that may be used for this determination, there is a risk of causing a breakdown in the transmission order of the messages and the like. Therefore, it is possible to correctly transmit and receive the message in order by adding the information for detecting or correcting an error of the identification information in the message. Further, even when an error is detected in whole message, it can be determined whether or not an error occurs in the identification information. Therefore, it is possible to easily perform the processing related to the message retransmission later and the like.

Further, in the present invention, each communication apparatus counts the number of errors occurring at the time of transmitting and receiving the messages using an error counter. When the occurrence number of errors is large, each communication apparatus may be malfunctioning or the like, such that each communication apparatus reduces the transmission frequency of messages when the occurrence number of errors counted exceeds a predetermined value. The reduction in the transmission frequency of messages can be achieved by a method of transmitting a message only once for several cycles, for example, even when the message is reached in its own transmission order as cyclically given. Even after the transmission frequency of messages is reduced, an error may occur, such that the message transmission of the communication apparatus may stop when the occurrence number of errors counted by the error counter exceeds an upper limit value.

As such, it is possible to prevent the message transmitted by the communication apparatus that is malfunctioning or the like from having an adverse effect on the processing of another communication apparatus and improve the reliability of the communication system, by controlling the message transmission according to the occurrence number of errors.

Further, according to the present invention, the plurality of communication apparatuses sharing the bus need to synchronously perform processings (in particular, the processings related to the slots). The plurality of communication apparatuses are not in a synchronous state immediately after the communication system wakes up by a power-on reset or returning from a sleep state and the like, such that each communication apparatus first wakes up, establishes the synchronization with another communication apparatus, and then starts the communication processing.

In this time, when each communication apparatus consistently receives the message from another communication apparatus during a predetermined cycle immediately after the communication apparatus wakes up and each communication apparatus receives a message during a predetermined cycle, it can be determined that another communication apparatus that started communication in advance is present. Therefore, in order to synchronize with said another communication apparatus, each communication apparatus transmits the next message in synchronization with the received message and starts the communication processing. When each communication apparatus does not receive a message during the predetermined cycle, it may be determined that another communication apparatus which started communications in advance is not present, such that each communication apparatus transmits a message to start the communication processing.

Therefore, after the communication system wakes up, the plurality of communication apparatuses are synchronized with one another to start the communication processing.

However, the plurality of communication apparatuses may simultaneously start message transmission on the basis of the determination that messages are not received during the predetermined cycle. In this case, a plurality of messages collide on the bus, such that another communication apparatus cannot receive a normal message. Therefore, according to the present invention, each communication apparatus includes time measuring means. When transmitting messages or receiving abnormal messages, after the standby time corresponding to the slot allocated to each communication apparatus is measured by the time measuring means, each communication apparatus transmits a message.

By the standby time corresponding to the slot allocated to each communication apparatus, the plurality of communication apparatuses in the communication system measure different standby times using the time measuring means, respectively. Therefore, after the collision of messages occurs, the communication apparatus to which the shortest standby time is set transmits the next message alone and another communication apparatus can normally receive this message and be synchronized with the communication apparatus which transmitted the message.

Further, after the communication system wakes up to establish the synchronization between the communication apparatuses, the deviation in synchronization may occur in one or more communication apparatuses due to problems with communications and the like. Therefore, according to the present invention, each communication apparatus includes the time measuring means and when not receiving the message from another communication apparatus during a predetermined cycle such as two cycles, after the standby time corresponding to the slot allocated to each communication apparatus is measured by the time measuring means, each communication apparatus transmits the message.

By the standby time corresponding to the slot allocated to each communication apparatus, the plurality of communication apparatuses in the communication system measure different standby time using the time measuring means. Therefore, even when the messages transmitted by the plurality of communication apparatuses collide due to the deviation in synchronization and each communication apparatus does not receive the message from another communication apparatus, the communication apparatus to which the shortest standby time is set transmit the next message alone. Therefore, another communication apparatus can normally receive this message and be synchronized with the communication apparatus which transmitted the message.

Further, according to the present invention, when the communication system is transited to a power saving operation state such as a sleep mode, each communication apparatus transmits a request (a sleep request) for stopping the message transmission to another communication apparatus and receives a sleep request from another communication apparatus. Next, when receiving the sleep request from the plurality of communication apparatuses within the communication system during the predetermined cycle, each communication apparatus stops the message transmission and is transited to the sleep mode. Therefore, the plurality of communication apparatuses within the communication system perform the transition preparation to the sleep mode, and then the plurality of communication apparatuses can be transited to the sleep mode simultaneously.

According to the present invention, when the slots are allocated to the plurality of communication apparatuses connected with the bus, and each communication apparatus cyclically transmits the messages in a prescribed order. When each communication apparatus transmits a message, each communication apparatus creates and transmits a message including a success/failure information of reception, each of which represents success/failure of the message reception related to another slot, and data to be transmitted to another communication apparatus. When each communication apparatus receives a message, each communication apparatus perform the retransmission according to the success/failure information of reception included in the received message. Therefore, there is no need to perform the arbitration of the existing CAN protocol and it is possible to achieve a high communication rate between the plurality of communication apparatuses connected with the bus.

The above and further objects and features will more fully be apparent from the following detailed description with accompanying drawings.

BRIEF DESCRIPTION OF THE DRAWINGS

FIG. 9 is a schematic view for describing the basic operation of slot management by the slot management means.

FIG. 14 is a table showing a list of communication errors detected in the communication system according to the present invention.

FIG. 15 is a table showing fluctuation conditions of an error counter.

FIG. 32 is a schematic view illustrating a message configuration of a communication system according to a modified example.

DETAILED DESCRIPTION OF NON-LIMITING EXAMPLE EMBODIMENTS

Hereinafter, the present invention will be described in detail with reference to the drawings illustrating embodiments thereof.

<Configuration of Communication System>

Figure 1:
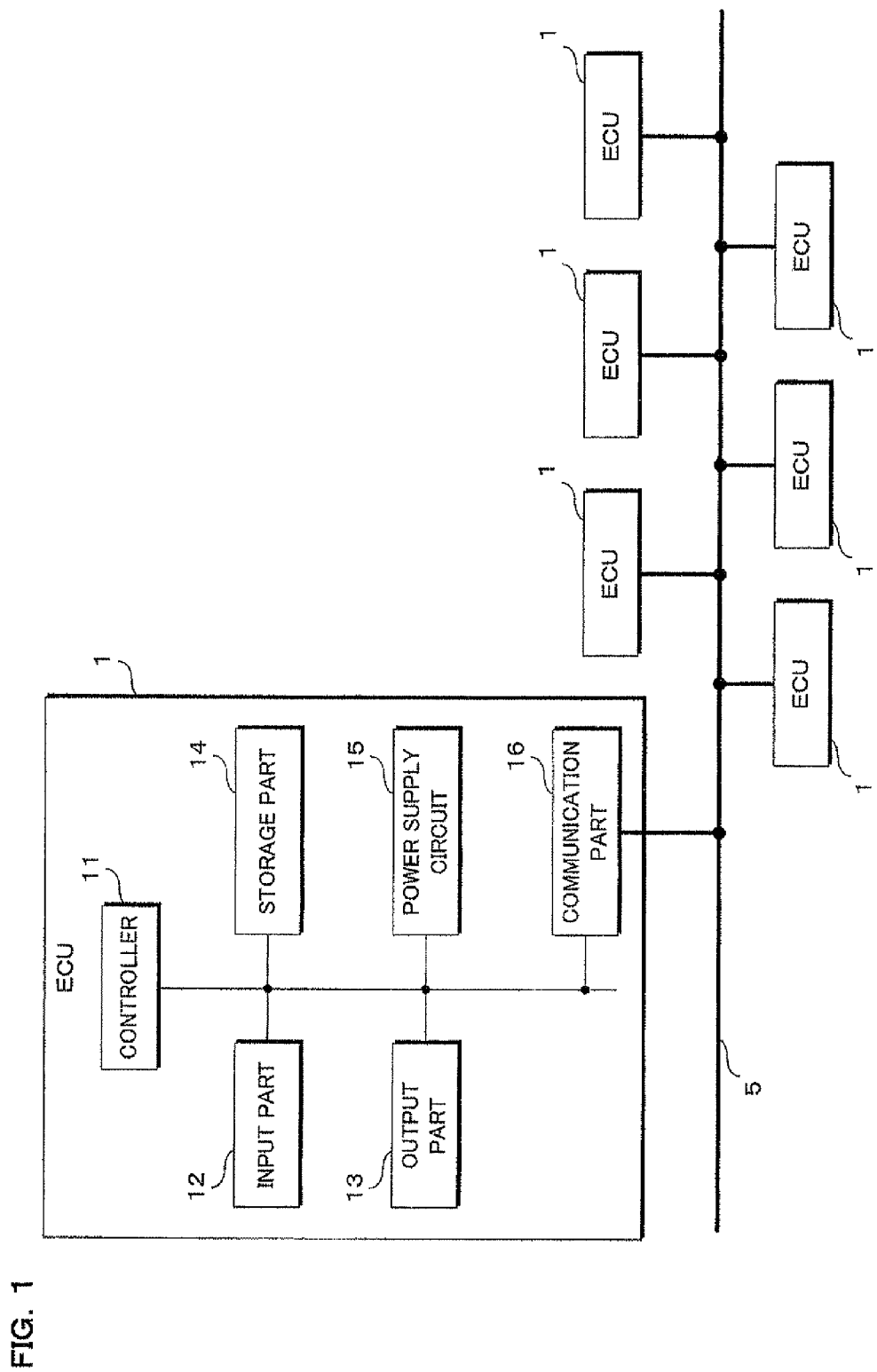
FIG. 1 is a block diagram illustrating a hardware configuration of a communication system and a communication apparatus according to the present invention.

FIG. 1 is a block diagram illustrating a hardware configuration of a communication system and a communication apparatus according to the present invention. In FIG. 1, reference numeral 1 is ECU (communication apparatuses) and a plurality of ECUs 1 are arranged at proper places of a vehicle (not shown). Each ECU 1 performs processings such as a control of various electronic devices equipped in the vehicle, or a detection of a traveling state of the vehicle using sensors. Further, the plurality of ECUs 1 may be connected with a common communication line (a bus) 5 provided in the vehicle to transmit and receive messages via the bus 5.

The bus 5 is configured like a bus used in the existing CAN protocol and includes a twisted pair cable that transmits an operating signal. A signal transmitted on the bus 5 is represented by "dominant" that is a dominant value corresponding to "0" of a logic bit and "recessive" that is a recessive value corresponding to "1" of the logic bit. However, in the communication system according to the present invention, signal values of the dominant and the recessive are not necessarily handled as the dominant value and the recessive value, but the same signal value is used to maintain compatibility with the existing CAN protocol.

Each ECU 1 that is a component of the communication system includes an input part 12 connected to sensors detecting a traveling state of the vehicle or the like to acquire signals input from the sensors, an output part 13 connected to an electronic device (not shown) which is a control object equipped in the vehicle to output a control signal and the like, a storage part 14 storing a program, data and the like required for a control function, a power supply circuit 15 supplying power to each part within the ECU 1, a communication part 16 connected to the bus 5 to transmit and receive data, and a controller 11 controlling an operation of each part within the ECU 1. Although FIG. 1 illustrates a detailed internal configuration of only one ECU 1, other ECUs 1 have the same configuration and therefore, the detailed internal configuration thereof will not be illustrated.

The input part 12 of the ECU 1 is connected to various sensors that detect a velocity of a vehicle, acceleration of a vehicle, a temperature of an engine, a steering angle of a steering wheel or the like. Detection values from the sensors are input to the input part 12 as a signal. The input part 12 acquires the detection values detected by the sensors and stores the acquired detection values in the storage part 14 and informs the controller 11 of the acquisition completion of the detection values from the sensors. The output part 13 is connected to electronic devices for electronically controlling various devices such as an engine or a brake of the vehicle. The output part 13 outputs the control signal for controlling the operation of various devices according to the control of the controller 11. Meanwhile, the ECU 1 may include only any one of the input part 12 or the output part 13.

The storage part 14 includes a data rewritable non-volatile memory device such as an electrically erasable programmable read only memory (EEPROM), or a flash memory. The storage part 14 stores the program executed by the controller 11, data and the like in advance and at the time of the power-on reset to the ECU 1, the ECU 1 reads a program, data and the like from the storage part 14 to start processing. Further, the storage part 14 stores various data created during the processing of the controller 11, the detection values detected by the sensors, data transmitted to other ECUs 1 by communications, data received from other ECUs 1 and the like. Meanwhile, the storage part 14 may be configured to be separately provided with a so-called ROM and a random access memory (RAM).

The power supply circuit 15 is connected to a power supply source (not shown) such as an alternator or battery of the vehicle to adjust power from the power supply source to voltage or current suitable for each part, and supply the adjusted power to each part.

The communication part 16 is connected to the bus 5 and reads transmitting data from the storage part 14 according to the control of the controller 11 and creates a message by adding predetermined information to the read data and outputs the created message to the bus 5, thereby transmitting the messages. The communication part 16 receives messages transmitted from other ECUs 1, extracts the required data from the received message and stores the extracted data in the storage part 14, and informs the controller 11 of the receiving completion. Further, the communication part 16 performs various control processings related to communications and performs various processings, such as control processing for transmitting and receiving a message using the bus 5 in a time division manner in synchronization with other ECUs 1, processing determining the success/failure of the message reception from other ECUs 1, processing responding to the message reception from other ECUs 1, or processing retransmitting its own message according to contents of the messages received from other ECUs 1. The details of the transmission and reception processing of the message performed by the ECU 1 will be described below.

The controller 11 acquires information based on the signal input to the input part 12, information received from other ECUs 1 via the bus 5 and the like, and operates on the basis of the acquired information to create a control signal, and outputs the control signal from the output part 13 to control electronic devices equipped in the vehicle. In this case where the controller 11 needs to share the information input from the sensor to the input part 12, an operation result or the like with other ECUs 1, the controller 11 creates the message including these information as data and transmits the created message from the communication part 16 to other ECUs 1.

<Function Configuration of Communication Apparatus>

Figure 2:
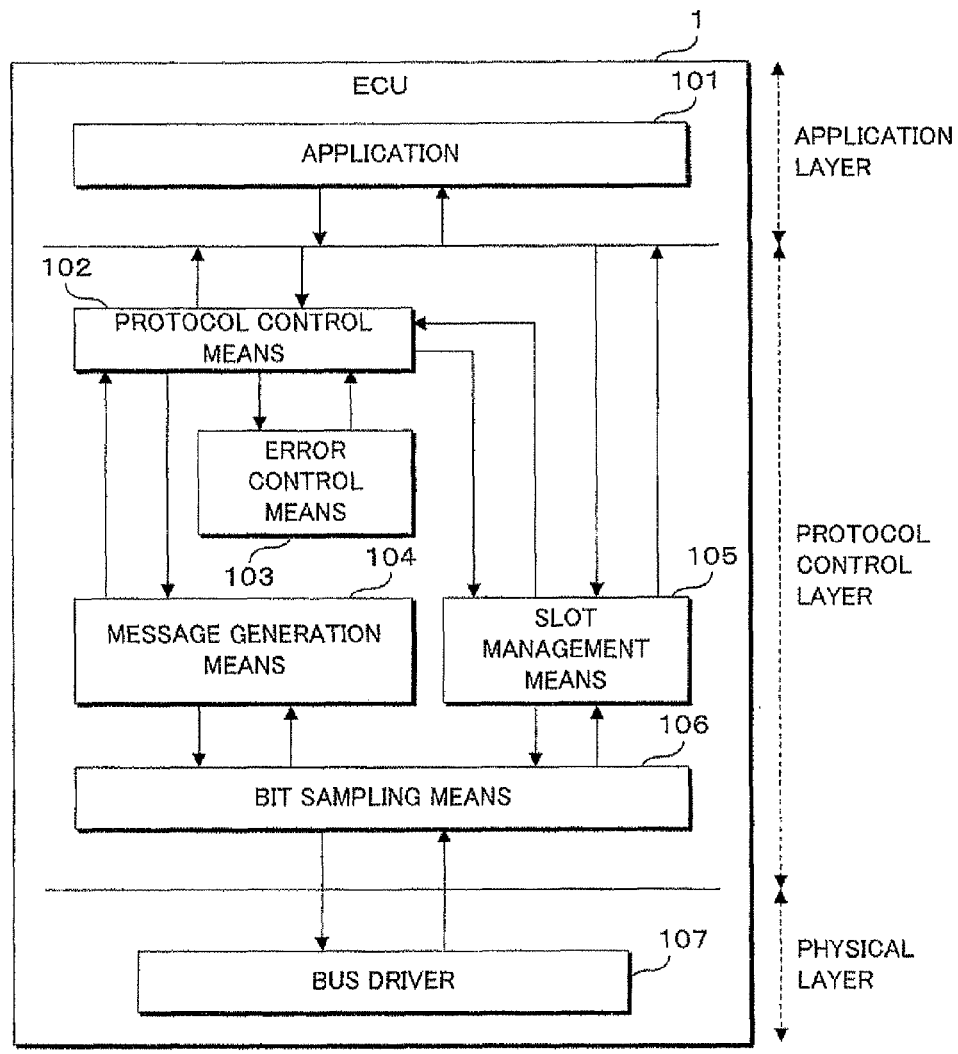
FIG. 2 is a block diagram illustrating a function configuration of the communication apparatus according to the present invention.

FIG. 2 is a block diagram illustrating a function configuration of the communication apparatus according to the present invention and illustrates a configuration related to the communication function that is achieved by the controller 11 and the communication part 16 of the ECU 1. The function of the ECU 1 may be divided into three layers, that is, an application layer, a protocol control layer, and a physical layer. The application layer includes one or more application softwares (hereinafter, referred to as "applications") 101. The protocol control layer includes a protocol control means 102, an error control means 103, message generation means 104, slot management means 105 and bit sampling means 106. Further, the physical layer includes a bus driver 107.

The physical layer is a layer related to a physical connection with the bus 5 and to transmission and reception of electrical signals to and from the bus 5. The physical layer of the ECU 1 corresponds to a physical layer of an open systems interconnection (OSI) reference model. The bus driver 107 of the physical layer outputs a signal corresponding to a value (dominant/recessive) of transmitting message provided from the protocol control layer to the bus 5, detect a signal level of the bus 5, converts the detected signal level into the dominant/recessive value, and provides the converted dominant/recessive value to the protocol control layer. The bus driver 107 is equipped in the communication part 16.

The application layer is a layer providing detailed services related to the control of electronic devices equipped in the vehicle. The application layer of the ECU 1 corresponds to an application layer of the OSI reference model. Each application 101 of the application layer uses a predetermined application programming interface (API) to exchange information with the protocol control layer. The application 101 is achieved by enabling the controller 11 to execute the programs and data that are stored in the storage part 14.

The bus driver 107 of the physical layer and the application 101 of the application layer in the ECU 1 according to the present embodiment may have substantially the same configuration as the configuration of the existing CAN protocol. The communication apparatus according to the present invention and the communication apparatus of the existing CAN protocol are different from each other in terms of the configuration of the protocol control layer and the communication protocol. However, the communication protocol of the communication apparatus according to the present invention is made by improving the existing CAN protocol as a base.

The communication protocol of the communication system according to the present invention is preferably used in a network of a bus connection in which the plurality of communication apparatuses as shown in FIG. 1 are connected with the common communication line. However, the communication protocol of the communication system according to the present invention may be used in a network having other configurations. For example, even in the network having a configuration in which the plurality of communication apparatuses are star-connected and a gateway is arranged at the center, the communication processing that is performed between the gate way and the communication apparatus can be performed by the communication protocol of the present invention. In the communication protocol of the present invention, the plurality of communication apparatuses performing communications do not have the vertical relationship of a master/slave and the like, and all the communication apparatuses communicate with each other in an equitable relationship.

In the existing CAN protocol, when the plurality of communication apparatuses simultaneously transmit messages to the bus, each communication apparatus performs arbitration processing (hereinafter referred to as "arbitration") according to priority of identifiers (IDs) included in the messages and the message having the highest priority is transmitted. On the other hand, in the communication protocol of the present invention the foregoing arbitration is not performed. In the communication protocol of the present invention, the plurality of ECUs 1 connected with the bus 5 cyclically transmit the messages (that is, periodically transmit the messages in a predetermined order). Therefore the bus 5 is used in a time division manner and the collision of message transmissions is avoided.

<Outline of Communication Protocol>

Figure 3A:
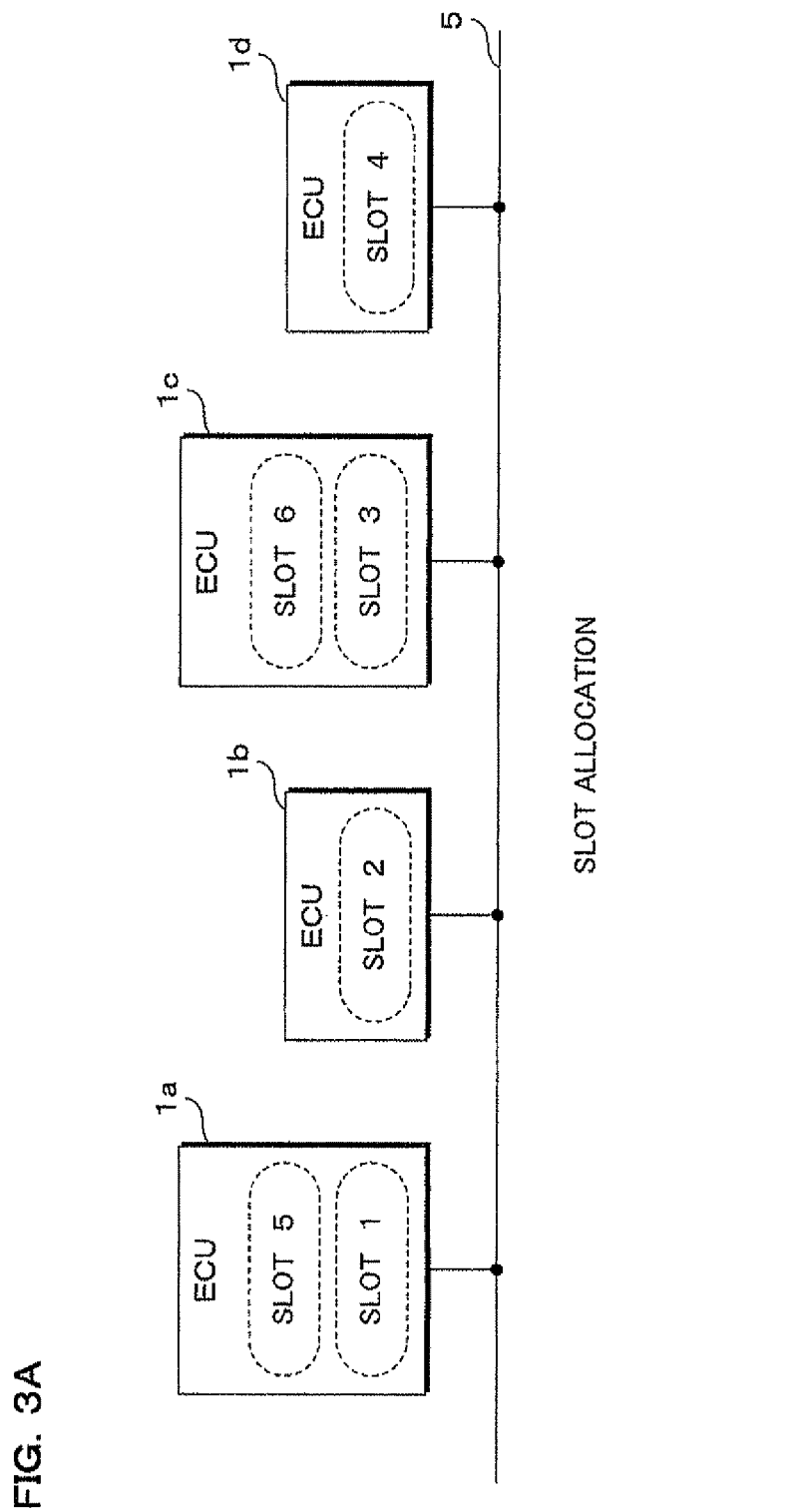
FIG. 3A is a schematic view for describing an outline of a communication protocol of the communication system according to the present invention.
Figure 3B:
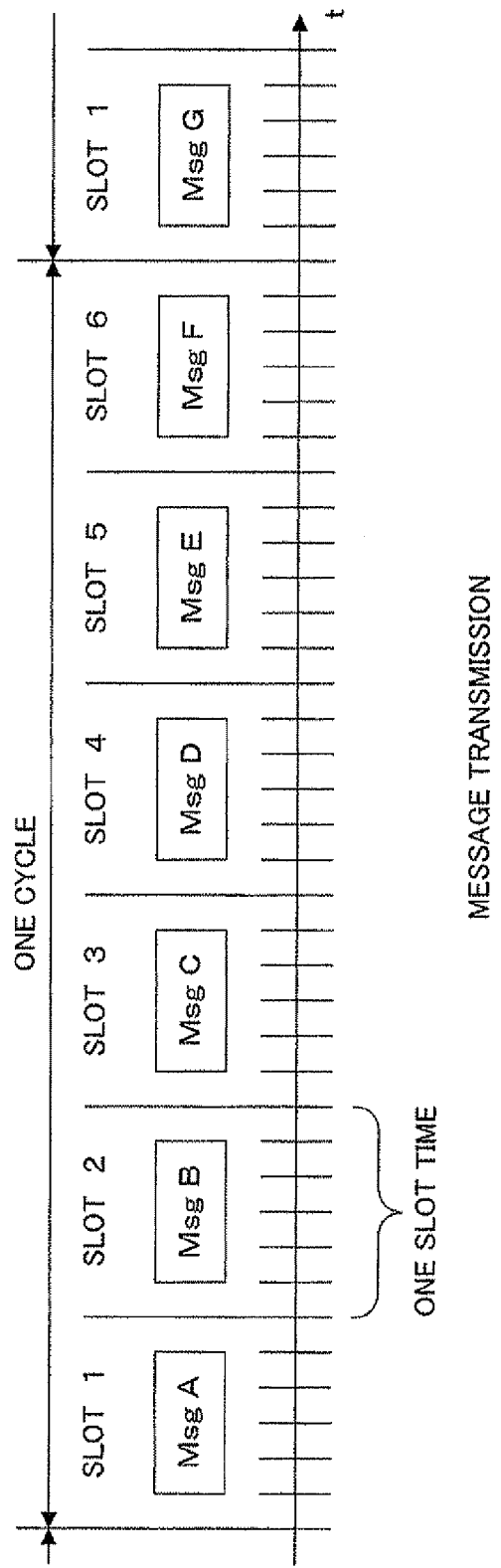
FIG. 3B is a schematic view for describing the outline of the communication protocol of the communication system according to the present invention.

FIGS. 3A and 3B are schematic views for describing the outline of the communication protocol of the communication system according to the present invention. In the following description, a configuration in which four ECUs 1 are connected with the bus 5 is considered and four ECUs 1 are differentiated by symbols of 1a to 1d, respectively. In the communication protocol of the present invention, one or more slots (slot number) are allocated in advance (statistically) to the ECUs 1a to 1d participating in the communication. The slot represents the transmission right when cyclically transmitting the messages, and the message related to the smaller slot number is transmitted earlier. Further, the overlapping of the slot number is not permitted and for one slot number, only one ECU of the ECUs 1a to 1d can perform transmission.

For example, as shown in FIG. 3A, the ECU 1a is allocated with slots 1 and 5, the ECU 1b is allocated with the slot 2, the ECU 1c is allocated with the slots 3 and 6, and the ECU 1d is allocated with the slot 4. Each of the ECUs 1a to 1d is, in advance, provided with common information such as a total number of slots in the network and maximum time (referred to as one slot time) in which the bus 5 may be used for one message transmission related to one slot.

The ECU allocated the lower slot number among ECUs 1a to 1d transmits a message in order during one cycle, time of which is the total number of slots×one slot time. For example, as shown in FIG. 3B, the ECU 1a to which the slot 1 is allocated first transmits message (abbreviated to Msg in the drawing) A, the ECU 1b to which the slot 2 is allocated secondly transmits message B, the ECU 1c to which the slot 3 is allocated thirdly transmits message C, and the ECU 1d to which the slot 4 is allocated fourthly transmits message D. Next, the ECU 1a to which the slot 5 is allocated fifthly transmits message E and the ECU 1c to which the slot 6 is allocated sixthly transmits message F. One cycle ends due to the ending of the message transmission related to the slot having a largest number and the ECU 1*a* to which the slot 1 is allocated transmits message G in the next cycle.

As described above, the plurality of ECUs 1*a* to 1*d* connected with the bus 5 cyclically transmit messages according to slot number in synchronization with one another, such that the plurality of messages do not collide on the bus 5. Therefore, each of the ECUs 1*a* to 1*d* does not need to perform the arbitration of the existing CAN protocol. Therefore, in the existing CAN protocol, when transmitting a message, the communication apparatus outputs the message to the bus, and then needs to detect whether a signal on the bus is changed for each bit. However, in the communication protocol of the present invention, there is no need to perform the detection processing for each bit and the high communication rate can be achieved. The foregoing control of the transmission and reception of the messages according to the slots is performed by the protocol control means 102, the slot management means 105 and the like in each of the ECUs 1*a* to 1*d*.

The message transmitted from any one ECU of the ECUs 1*a* to 1*d* can be received by all the other ECUs among the ECUs 1*a* to 1*d* that are connected with the bus 5. The other ECUs receiving the message need to perform a response (transmission of so-called acknowledgement (ACK)/negative acknowledgement (NAM) on whether the messages are accurately received, to the ECU which is a message transmission source. In the existing CAN protocol, the response may be performed based on an ACK slot of 1 bit included in the message and the communication apparatus which is the message transmission source can detect whether the signal is changed in the ACK slot period to determine whether the message is accurately received.

As described above, since in the communication protocol of the present invention, the change in signal for each bit is not detected at the time of transmitting the message, the response of the message reception is performed by a method different from the existing CAN protocol. Therefore, in the communication protocol of the present invention, the configuration of the message transmitted and received among the ECUs 1*a* to 1*d* can be extended further in some aspects than the configuration of message according to the existing CAN protocol.

<Generation of Message>

Figure 4A:
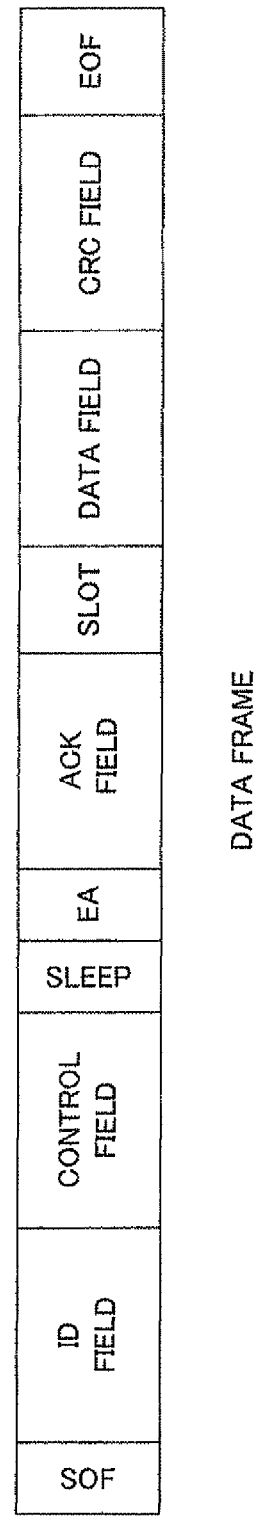
FIG. 4A is a schematic view illustrating a configuration of a message based on the communication protocol of the communication system according to the present invention.
Figure 4B:
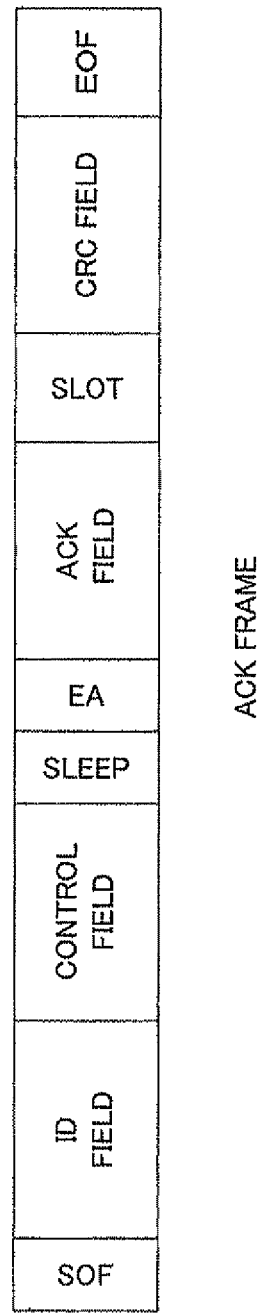
FIG. 4B is a schematic view illustrating a configuration of a message based on the communication protocol of the communication system according to the present invention.

Next, an operation of the message generation means 104 included in the protocol control layer of the ECU 1 will be described. FIGS. 4A and 4B are schematic views illustrating the configuration of messages based on the communication protocol of the communication system according to the present invention. The messages shown in FIGS. 4A and 4B may be created by the message generation means 104 of the ECU 1. In the communication protocol of the present invention, two types of messages, that is, the data frame and the ACK frame are used. The data frame based on the communication protocol of the present invention corresponds to the data frame based the existing CAN protocol and the ACK frame based on the communication protocol of the present invention is not present in frames based on the existing CAN protocol. The data frame is used to perform the data transmission to other ECUs 1 and the response related to the success/failure of data reception. The ACK frame is used when no data to be transmitted to other ECUs 1 is present as well as used when the start-up and sleep of the communication system are performed.

The data frame based on the present communication protocol includes a start of frame (SOF), an ID field, a control field, a sleep bit, an error active bit (abbreviated to "EA" in FIGS. 4A and 4B), an ACK field, a slot number field (abbreviated to "SLOT" in FIGS. 4A and 4B), a data field, a cyclic redundancy check (CRC) field, and an end of frame (EOF).

Further, the ACK frame is a frame in which the data field is excluded from the data frame. Meanwhile, the SOF, the control field, the data field, the EOF and the IFS are the same as the existing CAN protocol.

The SOF is the same as an SOF provided in the data frame of the existing CAN protocol. The SOF is a bit representing the start of the message and is the dominant of 1 bit. Each ECU 1 in the communication system detects the SOF on the bus 5 to synchronously receive the message.

The ID field is configured to be the same as the arbitration field provided in the data frame of the existing CAN protocol, but in the communication protocol of the present invention as described above, the arbitration is not performed. Therefore, the value of the ID field is merely used as the ID of the message. The ID field includes ID data and a remote transmission request (RTR) bit. The ID data representing a type of a message is configured of 11 bits in a standard format, and is configured of 29 bits in an extended format. The RTR is data of 1 bit and is the same as the existing CAN protocol.

The control field is the same as a control field of the existing CAN protocol and includes information such as an identifier extension (IDE) bit for differentiating the standard format or the extended format, and a data length code (DLC) of 4 bits representing a data length of the data frame. In the case where each of the ECUs 1*a* to 1*d* identifies the data frame and the ACK frame, the ID data of the ID field is used and the normally received frame as ID data=1 is set as the ACK frame (however, the value of the ID data is an example and other values may be used). Further, each of the ECUs 1*a* to 1*d* performs the transmission by setting DLC=0 in the ACK frame. The ECUs 1*a* to 1*d* receiving the ACK frame perform the reception processing by considering DLC=0 even though the receiving frame is DLC≠0 at the time of receiving the frame of ID data=1.

The sleep bit is the information of 1 bit used at the time of the processing related to the sleep of the communication system and is used only in the ACK frame. When the sleep bit is set as the dominant, a general operation is performed. When the sleep bit is set as the recessive, the ACK frame is received as the sleep request and the processing related to the sleep starts. Further, in the data frame, the sleep bit is set as the dominant at all times.

The error active bit is the information of 1 bit and is used to give information of an error state when errors related to the communication processing occurs. When the error active bit is set as the dominant, the error state is error active. When the error active bit is set as the recessive, the error state is error passive (a detailed description of error active, error passive and the like will be described below).

The ACK field is the information of the same number of bits as the total number of slots in the communication system. Each bit of the ACK field corresponds to one slot, and the success/failure information of the message reception of the slot in one cycle is set in the corresponding bit. For example, when the total number of slots is 16, the ACK field is 16 bit information and the success/failure information of reception of slot 1 is set in a first bit, the success/failure information of reception of slot 2 is set in a second bit, . . . , and the success/failure information of reception of slot 16 is set in a sixteenth bit. Further, in each bit of the ACK field, the value representing the recessive corresponds to the success of reception (ACK) and the value representing the dominant corresponds to the failure of reception (NAK).

However, the functions such as the arbitration, and an ACK bit of the existing CAN protocol are not required in the communication system of the present invention. Therefore, in the communication system of the present invention, the dominant may corresponds to the ACK and the recessive may corresponds to the NAK. That is, if the combinations of the ACK and NAK of the ACK field and the recessive and the dominant are united within the communication system, the combinations are not particularly limited and therefore, any combination may be used.

The number of a slot related to the message transmission is set in the slot number and the slot number is used when each ECU 1 performs synchronization correction (a detailed description thereof will be described below) in the communication system. The data size of the slot number is defined by a total number of slots and when the total number of slots is, for example, 16, the slot number is 4 bit information.

The data field is the same as the data field provided in the data frame of the existing CAN protocol. The data field includes data of zero to 8 bytes, and is transmitted in a most significant bit (MSB) first format. Each ECU 1 adds any data to be transmitted to other ECUs 1 in the data field and transmits the message, the data field of which includes the added data.

The CRC field includes a CRC sequence of 15 bits and a CRC delimiter of 1 bit (bits for delimit), and is used to detect the error of the received message. The CRC sequence can be acquired by performing an operation on the values including in from the SOF to the data field using a predetermined generator polynomial. It is noted that the generator polynomial used in the operation may be the same as one used in the existing CAN protocol. The ECU 1 receiving the message can compare the values of the CRC sequence of the received message with the values calculated by the generator polynomial for the received messages to detect errors. When those two values do not coincide with each other, it is determined that errors have occurred. The CRC delimiter is a recessive of 1 bit in the existing CAN protocol, but is a total of 2 bits that are a recessive of 1 bit and a dominant of 1 bit in the communication protocol of the present invention. It is noted that the length of the CRC sequence is not limited to 15 bits and may be 14 bits or less or 16 bits or more.

The EOF is the same as the EOF provided in the data frame of the existing CAN protocol. The EOF is a bit representing the ending of the data frame, and is a recessive of 7 bits.

The message generation means 104 of the ECU 1 creates the data frame and the ACK frame described above according to the control of the protocol control means 102. The message generation means 104 transmits the created message to the bus driver 107 via bit sampling means 106 to output the message to the bus 5 and to transmit the message to all the other ECUs 1 connected to the bus 5. Further, the message generation means 104 extracts data of each field shown in FIG. 4A or FIG. 4B from the sampling result given by the bit sampling means 106, that is, the received message and provides the extracted data to the protocol control means 102.

Figure 5:
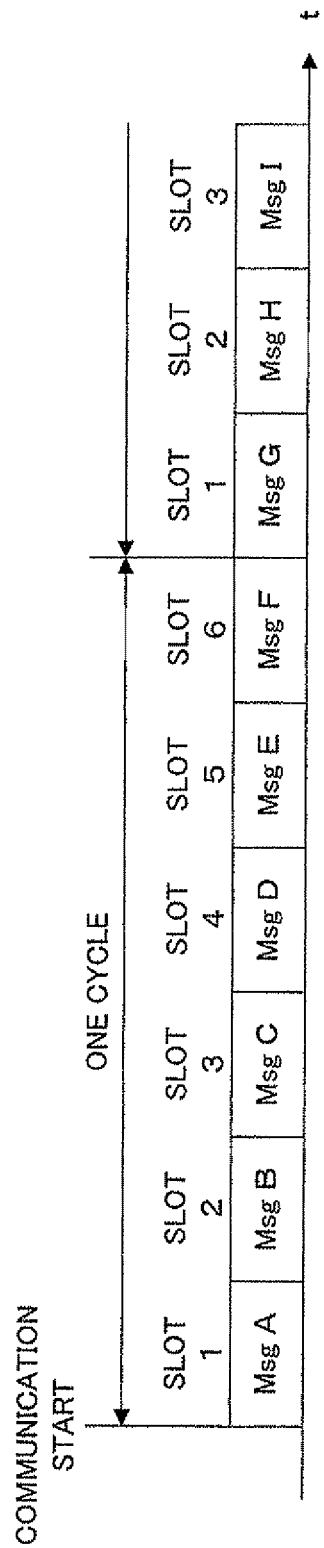
FIG. 5 is a schematic view for describing response processing performed in the communication system according to the present invention.
Figure 6:
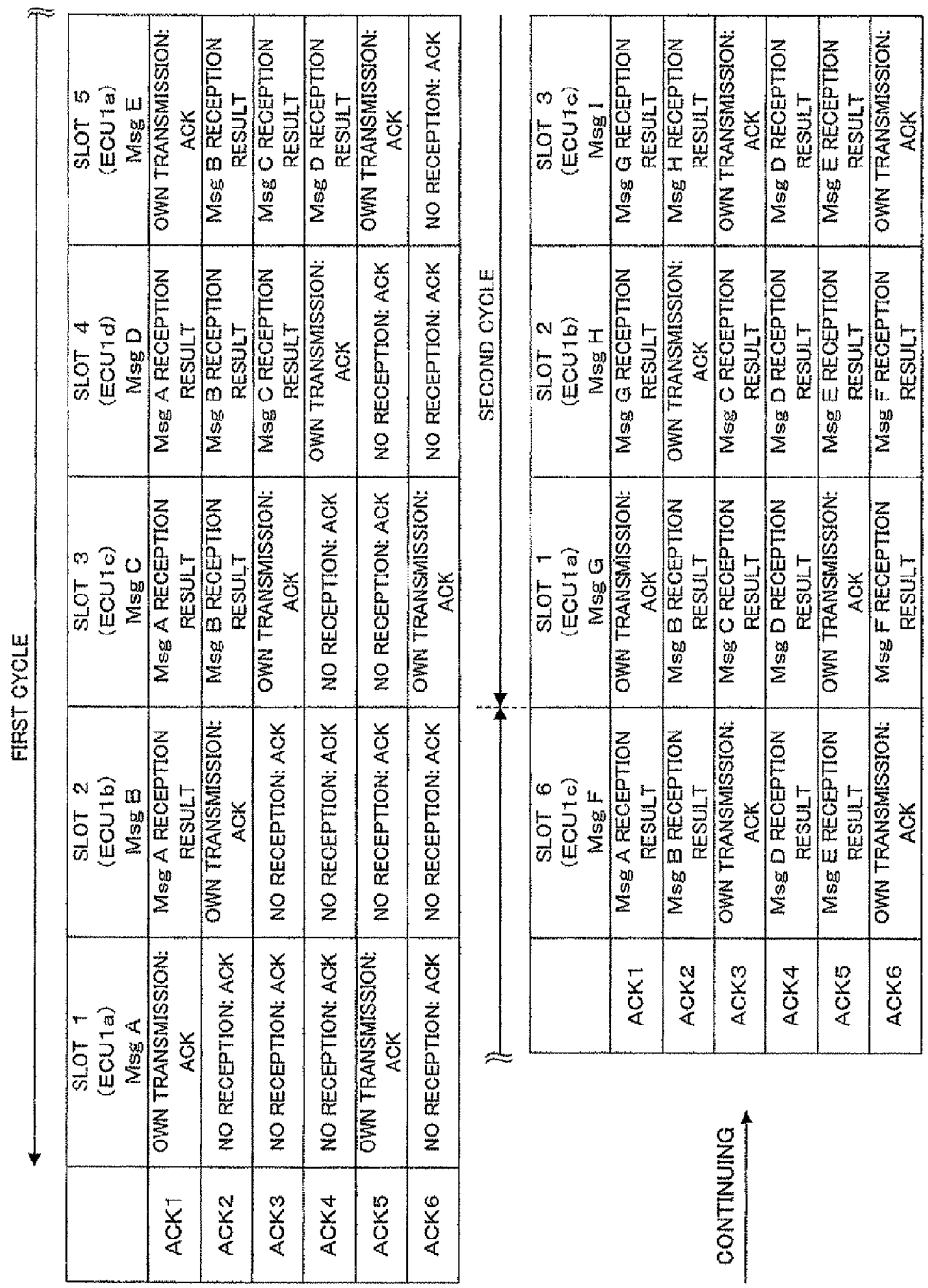
FIG. 6 is a schematic view for describing the response processing performed in the communication system according to the present invention.

FIGS. 5 and 6 are schematic views for describing the response processing performed in the communication system according to the present invention. FIG. 5 illustrates an example of the message transmission within the communication system and FIG. 6 illustrates the contents of the ACK field included in each message. It is noted that examples shown in FIGS. 5 and 6 are based on the configuration (four ECUs 1a to 1d transmits messages using six slots) of the communication system shown in FIG. 3A.

As shown in FIG. 5, in the case where the communication starts by wake-up of each of the ECUs 1 in the communication system, the message transmission is started by the ECU 1a to which the slot 1 is allocated, and the plurality of ECUs 1a to 1d transmit messages in the numerical order of slots. In the illustrated example, the ECU 1a to which the slot 1 is allocated transmits message A, the ECU 1b to which the slot 2 is allocated transmits the message B, the ECU 1c to which the slot 3 is allocated transmits the message C, the ECU 1d to which the slot 4 is allocated transmits the message D, the ECU 1a to which the slot 5 is allocated transmits the message E, and the ECU 1c to which the slot 6 is allocated transmits the message F and therefore, one cycle ends. In the next cycle, the ECU 1a to which the slot 1 is allocated transmits the message G, the ECU 1b to which the slot 2 is allocated transmits message H, and the ECU 1c to which the slot 3 is allocated transmits message I and the same processing is repeated.

As shown in FIG. 6, the message transmitted by each of the ECUs 1a to 1d includes the information (ACKs 1 to 6) of 6 bits (=the number of slots) as the ACK field and the success/failure of the message reception for the slot 1 to slot 6 is set in ACK 1 to ACK 6, respectively, as the recessive (ACK) or the dominant (NAK) of 1 bit. Further, each of the ECUs 1a to 1d sets ACK in bits of the ACK fields for the slots allocated thereto to transmit the messages.

Immediately after the communication starts in the communication system, each of the ECUs 1a to 1d does not yet perform transmission and reception of the message and does not receive a message. As such, in one cycle immediately after the communication starts, each of the ECUs 1a to 1d transmits messages by setting ACKs in the bits of the ACK field related to slots, the message transmission and reception of which are not performed.

In the communication related to the slot 1 of a first cycle after the communication starts, the ECU 1a creates and transmits the message A in which ACKs are set in the ACK 1 and ACK 5 corresponding to the slot 1 and slot 5 allocated to the ECU 1a, and ACKs are set in the ACKs 2 to 4 and 6 corresponding to slots 2 to 4 and 6, the message transmission and reception of which are not performed.

Next, in the communication related to the slot 2 of the first cycle, the ECU 1b creates and transmits the message B in which the success/failure (ACK/NAK) of reception of the message A transmitted by communications related to the slot 1 is set in the ACK 1, ACK is set in the ACK 2 corresponding to the slot 2 allocated to the ECU 1b, and ACKs are set in the ACKs 3 to 6 corresponding to slots 3 to 6, the message transmission and reception of which are not performed.

Next, in the communication related to the slot 3 of the first cycle, the ECU 1c creates and transmits the message C in which the success/failure of reception relating to messages A and B transmitted in the communications related to the slots 1 and 2 is set in the ACKs 1 and 2 respectively, ACKs are set in the ACKs 3 and 6 corresponding to the slots 3 and 6 allocated to the ECU 1c, and ACKs are set in the ACKs 4 and 5 corresponding to the slots 4 and 5, the message transmission and reception of which are not performed.

Similarly, the transmission of the message D of the ECU 1d related to the slot 4 of the first cycle, the transmission of the message E of the ECU 1a related to the slot 5, and the transmission of the message F of the ECU 1c related to the slot 6 are performed. When the transmission and reception of the messages of one cycle end, each of the ECUs 1a to 1d transmits at least one message, and ECU 1a can determine whether the message A transmitted in the slot 1 of the first cycle is accurately received by other ECUs 1b to 1d, by checking the ACK field of the messages B, C, D, and F from the other ECUs 1b to 1d, that is, by determining whether ACK is set in the ACK 1 of all the messages.

When the ACKs 1 of all the messages are set as ACK, the ECU 1a determines that the message A transmitted in the slot 1 is normally received by all the ECUs 1b to 1d, and transmits the message G of other data in the slot 1 of the next cycle. On the other hand, when any one of ACKs 1 is set as NAK, the ECU 1a determines that the message A transmitted in the slot 1 was not accurately received, and retransmits the message A in the slot 1 of the next cycle. In the example shown in FIG. 6 the message A is normally received by all the other ECUs 1b to 1d.

In the communications related to the slot 1 of a second cycle, the ECU 1a creates and transmits the message G in which the success/failure of reception related to messages B to D and F related to the slots 2 to 4 and 6 of the first cycle is set in the ACKs 2 to 4 and 6, and ACKs are set in the ACKs 1 and 5 corresponding to the slots 1 and 5 allocated to the ECU 1a.

Similarly, the ECU 1b can determine whether the message B transmitted by the ECU 1b in the slot 2 of the first cycle is accurately received by other ECUs 1a, 1c and 1d, by checking the ACK field of the received message during one cycle from the slot 3 of the first cycle to the slot 1 of the second cycle. In the communications related to the slot 2 of the second cycle, the ECU 1b creates and transmits a new message H shown in FIG. 6 when the message B is accurately received, while the ECU 1b retransmits the message B when the message B is not accurately received.

Similarly, the ECU 1c can determine whether the message C transmitted by the ECU 1c in the slot 3 of the first cycle is accurately received by the other ECUs 1a, 1b and 1d, by checking the ACK field of the received message during one cycle from the slot 4 of the first cycle to the slot 2 of the second cycle. In the communications related to the slot 3 of the second cycle, the ECU 1c creates and transmits a new message I shown in FIG. 6 when the message C is accurately received, while the ECU 1c retransmits the message C when the message C is not accurately received.

As such, each of the ECUs 1a to 1d creates the message including the data (the data field) to be transmitted to other ECUs 1a to 1d and the information (the ACK field) representing the success/failure of the message reception from other ECUs 1a to 1d. Each of the ECUs 1a to 1d transmits the created message to all the other ECUs 1a to 1d in the slots allocated thereto. Therefore, each of the ECUs 1a to 1d can receive the messages from all the ECUs 1a to 1d during one cycle, can determine whether the previously transmitted message is accurately received by all the other ECUs 1a to 1d by checking the ACK fields included in each message, and can determine whether each of the ECUs 1a to 1d needs to retransmit the transmitted message. Further, each of the ECUs 1a to 1d may transmit the ACK frame in the slot allocated thereto when no data to be transmitted to other ECUs 1a to 1d are present.

In the existing CAN protocol, each communication apparatus included in the communication system performs the writing (processing of changing from the recessive to the dominant) for the ACK slot included in the message output on the bus, such that the communication apparatus of the message transmission source can determine the success/failure of the message reception. The present invention performs the response to the message reception as described above in the protocol control layers of each of the ECUs 1a to 1d, such that in the communication system errors can be detected as in the existing CAN protocol. Each application 101 of the application layer can perform the processing related to the communications by the same method regardless of the existing CAN protocol or the communication protocol of the present invention, and a developer of the application 101 can perform the development regardless of the existing CAN protocol or the communication protocol of the present invention.

<Bit Sampling>

Next, an operation of the bit sampling means 106 included in the protocol control layer of the ECU 1 will be described. In the communication system of the present invention, the signal on the bus 5 is handled as a two-valued signal that is represented as the logic value of the dominant or the recessive, as in the existing CAN protocol. The bit sampling means 106 provides the two-valued data (that is, message) obtained by periodically sampling the signal on the bus 5 to the message generation means 104 and the slot generation means 105, and provides the two-valued data to the protocol control means 102 through these means.

When the plurality of ECUs 1 connected to the common bus 5 receive the messages, all the ECUs 1 need to perform the reception processing in synchronization with one another. The bit sampling means 106 performs the processing of synchronizing other ECUs 1 according to the change in the signal on the bus 5. The synchronization method by the bit sampling means 106 has two types of synchronization: hard synchronization and re-synchronization.

In the hard synchronization, when the signal on the bus 5 is the recessive for a predetermined period of time or more, the bit sampling means 106 determines that a message is not transmitted and received, and then the synchronization for the timing (the timing of SOF of message) at which the signal on the bus 5 is changed from the recessive to the dominant is performed. The bit sampling means 106 performs the sampling of the signal value on the bus 5 by using the edge of the change in the signal of the SOF as the synchronization point. The hard synchronization by the bit sampling means 106 is processed as though being performed in the existing CAN protocol.

In the re-synchronization, the bit sampling means 106 performs the synchronization correction according to the change in bits other than the bit performing the hard synchronization. The bit sampling means 106 compares a position of the change in the signal considered by the bit sampling means 106 with the position of the change in the signal actually detected on the bus 5 to calculate errors and corrects the timing of the sampling so as to remove these errors. Meanwhile, in the existing CAN protocol the re-synchronization is performed at both of the transmission and reception of the message, but in the communication protocol of the present invention the signal level of the bus 5 is not detected at the time of the transmission of the message, such that the re-synchronization processing is performed only at the time of reception of the message.

<Slot Management>

Next, an operation of the slot management means 105 included in the protocol control layer of the ECU 1 will be described below. The slot management means 105 of the ECU 1 manages the slots allocated to each ECU 1 in advance so that the plurality of ECUs 1 cyclically transmit the messages, as described above. In the communication protocol of the present invention, the plurality of ECUs 1 need to commonly know which of the slots is authorized with the transmission of the message at any timing. The slot management means 105 performs the management processing, of the slot for commonly knowing the slot related to the message transmission, that is the synchronization processing. When message transmission is not performed at all for one slot, the slot management means 105 skips said one slot and performs the slot manage in which the message related to the next slot is transmitted and received.

In the communication protocol of the present invention, when each ECU 1 detects that a message is not transmitted in one slot, each ECU 1 does not perform the reception processing of the messages related to said one slot and performs the processing of the next slot, such that the transmission and reception processing of the messages related to the ECU 1 which does not transmit the messages due to a failure and the like is omitted, and only the ECUs 1 that can transmit the messages communicate with each other.

Therefore, even when a malfunctioning ECU 1 which cannot transmit messages is included in the communication system, the processing of the slot related to this ECU 1 is omitted, such that other ECUs 1 in the communication system can transmit and receive messages to and from one another. Further, even when the reserved slots are provided in order to optionally add the ECU 1 to the communication system and optional equipment is not added, the processing related to the reserved slots may be omitted.

Figure 7:
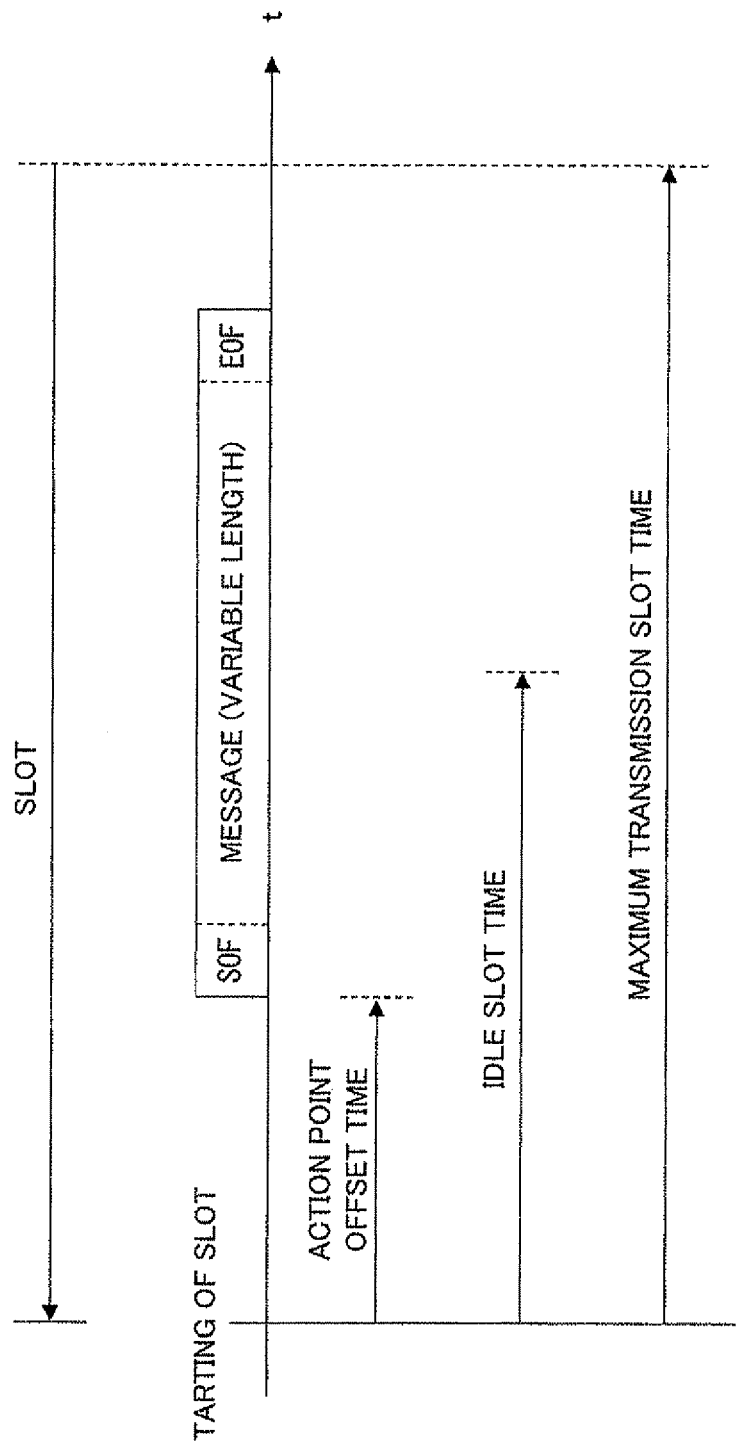
FIG. 7 is a schematic view for describing an action point offset time, an idle slot time, and a maximum transmission slot time.

In order to achieve the foregoing processings, for one slot time at which the message can be transmitted, the action point offset time, the idle slot time, and the maximum transmission slot time are set in the slot management means 105 of each ECU 1 in advance. The slot management means 105 of each ECU 1 determines, on the basis of these predetermined time, that the message related to the slot allocated to each of other ECUs 1 is not transmitted. The slot management means 105 of each ECU 1 performs the processing of omitting the reception processing of the messages related to the slot, the transmission of which is not performed. FIG. 7 is a schematic view for describing the action point offset time, the idle slot time, and the maximum transmission slot time.

Each ECU 1 waits until the predetermined action offset time lapses and starts the message transmission, when time reaches a starting point of the slot allocated thereto. The starting point of the message transmission related to the slot is referred to as the action point, and the time from the starting point of the slot to the action point is the action point offset time.

When time reaches the starting point of the slot allocated to one of ECUs 1 and the message related to this slot is not transmitted while the idle slot time lapses, each ECU 1 considers that the ECU 1 to which this slot is allocated does not transmit the message for any reason and preforms the communication processing related to the next slot.

Further, each ECU 1 transmits the message between the starting point of the slot allocated thereto and the time when the maximum transmission slot time lapses. The message transmitted by each ECU 1 may have a variable length, but each ECU 1 cannot transmit a message exceeding the maximum transmission slot time. Therefore, even when the ECU 1 continuously transmits the abnormal message due to a failure and the like, after the maximum transmission slot time lapses, the message transmission is stopped and the ECU 1 performs the communication processing related to the next slot.

The foregoing predetermined time is previously set in a design phase of the communication system so as to meet the following condition.

Idle slot time>action point offset time+frame detection confirmation time+RTT±α

Maximum transmission slot time>maximum transmission time of 1 frame+action point offset time±α

In the foregoing conditions, the round trip time (RTT) is the time required for the message to reciprocate between two ECUs. In addition, the frame detection confirmation time is, after the message transmitted from one ECU 1 reaches other ECUs 1, the time required for other ECUs 1 to recognize the message reception. The frame detection confirmation time includes the internal delay time of the communication part 16 of the ECU 1 and the time required to detect the change in the signal. Further, α is a margin that allows the accumulation of the clock errors among the plurality of ECUs 1.

Figure 8:
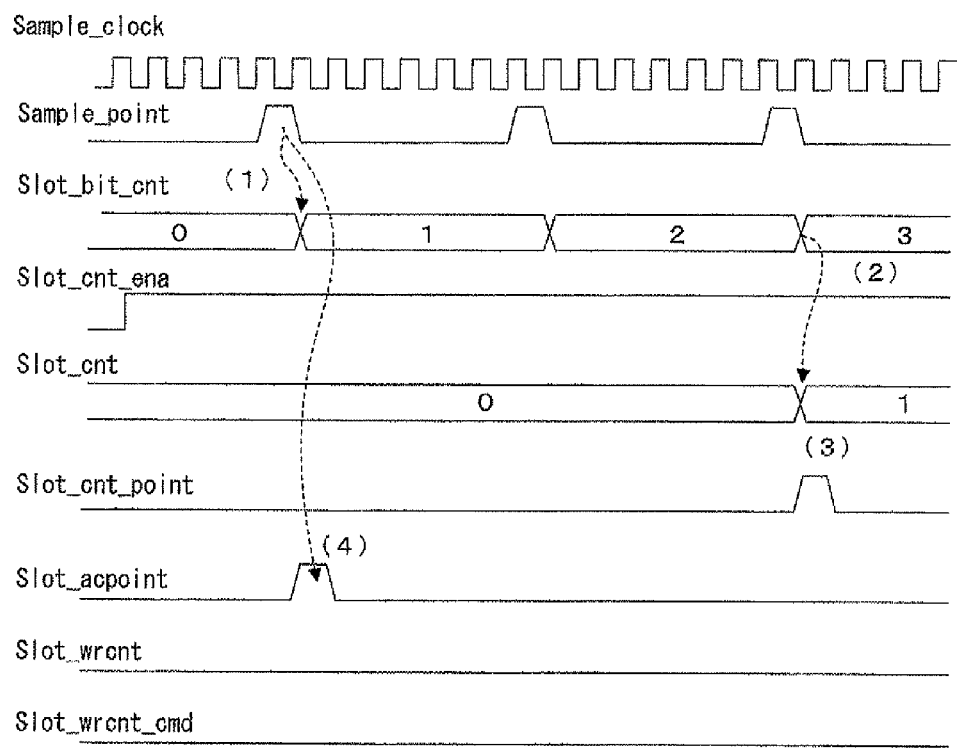
FIG. 8 is a schematic view for describing a basic operation of slot management by a slot management means.

FIGS. 8 and 9 are schematic views for describing a basic operation of the slot management by the slot management means 105. FIG. 8 illustrates a timing chart of a signal used in the slot management, and FIG. 9 illustrates the definition of each signal as a table. Each ECU 1 includes an oscillator therein, the internal operation clock output by the oscillator is Sample_clock (FIG. 8 illustrates only the rising (or may be falling) edge of the operation clock) and each part (each means) within the ECU 1 performs the processing on the basis of this operation clock. Meanwhile, the plurality of ECUs 1 connected to the common bus 5 are operated at an operation clock of substantially the same frequency. Further, the signal representing the sampling point of the received message by the bit sampling means 106 is Sample_point.

The slot management means 105 has two counters, that is, a bit counter (Slot_bit_cnt) and a slot counter (Slot_cnt). The bit counter is a counter representing that the n-th bit of the transmitted and received message has been processed. The bit counter is counted up for each sampling point of the bit sampling means 106 (i.e. is counted up by detecting that the value of the Sample_point is changed to 1 (high level)) (see arrow (1) in the drawing).

The slot counter of the slot management means 105 is a counter that represents the slot having a right that transmits the message at this point. The slot counter is counted up when the slot_cnt_ena is a high level and the bit counter exceeds a predetermined value (the predetermined value is (2) in FIG. 8) (see arrow 2 in the drawing). Further, the slot counter initializes the value when the Slot_cnt_ena is at the high level and the number of the slots in which processing is performed exceeds the number of slots per one cycle.

When the value of the slot counter is changed, the signal Slot_cnt_point is at a high level for one clock (see arrow (3) in the drawing) and the change in the slot is informed to each means in the ECU 1 by this signal. Further, the signal Slot_acpoint represents the action point in the slot. When the predetermined action point offset time (Slot_acpoint_bit) lapses from the starting of the slot (in the example of FIG. 8, the action point offset time is 1 and the timing at which the value of the bit counter is changed to 1), the signal Slot_acpoint is at the high level for one clock (see arrow (4) in the drawing).

Signal Slot_wrcnt and signal Slot_wrcnt_cmd are signals input from the outside of the slot management means 105 and are used for such as a synchronization processing to be described below. The signal Slot_wrcnt is used to allow the protocol control means 102 to provide the slot number and the like included in the normally received message to the slot management means 105. Further, the signal Slot_wrcnt_cmd is used to indicate the timing at which the slot management means 105 writes (imported thereto) the slot number designated at the signal Slot_wrcnt.

The slot management means 105 counts up or initializes the value of the slot counter according to the above-mentioned plurality of signals and the value of the bit counter to manage the slot number that can transmit the message at this point. Further, in the plurality of ECUs 1 connected to the common bus 5, each slot management means 105 needs to share the slot number, and the slot management means 105 performs the synchronization processing of the slot counter at the time of the message reception.

Figure 10:
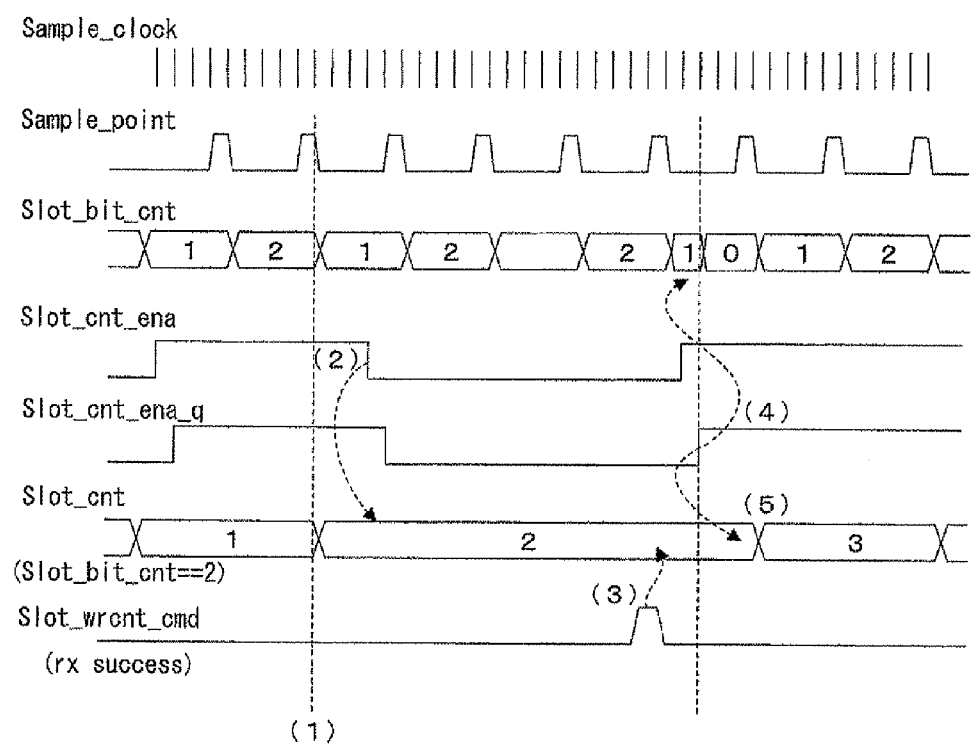
FIG. 10 is a timing chart for describing synchronization processing of a slot counter by the slot management means.

FIG. 10 is a timing chart for describing the synchronization processing of the slot counter by the slot management means 105. Meanwhile, the signal shown in FIG. 10 is the same as ones shown in FIGS. 8 and 9, and a signal Slot_cnt_ena_q is a signal delaying the signal Slot_cnt_ena by one clock. In the timing shown by a dotted line (1) in the drawing, the bit count reaches a predetermined value, such that the slot management means 105 increments the slot counter from the slot 1 to the slot 2. Next, the message reception from other ECUs 1 starts and the slot management means 105 changes the signal Slot_cnt_ena from a high level to a low level at this timing and the value of the slot counter is fixed (see arrow (2) in the drawing).

When the reception processing of the message normally ends, the receiving ending is informed by the signal Slot_wrcnt_cmd from the protocol control means 102. In this case, the slot number included in the normally received message is provided to the slot management means 105 from the protocol control means 102 as the signal Slot_wrcnt. The slot management means 105 imports the provided slot number according to the timing to inform the receiving end by the signal Slot_wrcnt_cmd and sets the imported slot number in the slot counter (see arrow (3) in the drawing). Therefore, the synchronization of the slot counter is performed.

After the receiving end is informed of the slot management means 105 by the signal Slot_wrcnt_cmd, the slot management means 105 changes the signal Slot_cnt_ena to the high level and permits the update of the slot counter. By changing the signal Slot_cnt_ena_q from the low level to the high level, the value of the bit counter is initialized (see arrow (4) in the drawing), and the value of the slot counter is incremented at the next sampling point (see arrow (5) in the drawing).

Further, the slot management means 105 of each ECU 1 performs the foregoing synchronization processing each time the message reception is performed. However, in the slot management means 105 of the ECU 1 transmitting the message, the synchronization processing is not performed.

<Protocol Control>

Next, an operation of the protocol control means 102 included in the protocol control layer of the ECU 1 will be described. As described above, in the communication protocol of the present invention, the plurality of ECUs 1 connected to the common bus 5 synchronize the slot number and the slot time and each ECU 1 transmits the message when each ECU 1 reaches the transmission order of the slot number allocated thereto, thereby avoiding the collision of messages. The protocol control means 102 performs the message transmission and reception processing according to the slot numbers, the processing of setting the ACK or the NAK in the ACK field in the transmitted message, the processing of retransmitting the message according to the values of the ACK field in the received message and the like, as shown in FIGS. 3A, 3B, 5, 6 and the like. Further, the protocol control means 102 performs the processing (start-up sequence) for starting communication by performing the synchronization of the plurality of ECUs 1 at the time when the communication system wakes up and the like, the re-synchronization processing (re-synchronization sequence) performed in the case where a deviation in synchronization among the plurality of ECUs 1 occurs due to any communication disturbance and the like, the processing (sleep sequence) performed in the case where the operation of the communication system stops, and the like.

After each ECU 1 in the present communication system wakes up by the power-on reset and the like, the protocol control means 102 performs the processing for synchronizing the slots with other ECUs 1 sharing the bus 5 as the start-up sequence. In the start-up sequence, the ECU 1 determines whether or not the communication by other ECUs 1 has started by checking whether or not a signal is present on the bus 5. When it is determined that the communication have not started, the protocol control means 102 of the ECU 1 starts its own message transmission to promote the wake up of other ECUs 1. When it is determined that communications have started, the protocol control means 102 receives messages from other ECUs 1 and performs the next communication processing in synchronization with the slot number included in the received message.

However, when the plurality of ECUs 1 determines that communication have not started, the message transmission by the plurality of ECUs 1 may collide with one another. In this case, other ECUs 1 receiving the collided message regard this message as included in the slot 1 to perform the communication processing after the next slot. The ECU 1 detecting abnormality in the next communication processing corrects the processing to suppress the occurrence of message collision.

Further, in the communication system, after the message transmission and reception starts normally, each ECU 1 performs the synchronization of slots at the time of the message reception as described above, such that the synchronization of the message transmission and reception by the plurality of ECUs 1 in the communication system is maintained. However, deviations in the slot numbers may occur due to any communication disturbance and the like. Each ECU 1 in the present communication system continues to perform the communication processing even when the deviations occur. Each ECU 1 detecting abnormality in the next communication processing performs the re-synchronization processing. The protocol control means 102 of each ECU 1 determines that the communication abnormality occurs when the normally received message is not present from the slot transmitted from the protocol control means 102 to the slot after two cycles and performs the re-synchronization sequence.

When the operation of the communication system stops and transits to the low power consumption state (the sleep mode), it is necessary that each ECU 1 in the communication system and other ECUs 1 have come to an agreement on the transition to the sleep mode, and then each ECU 1 transits to the sleep mode. The determination whether each ECU 1 transits to the sleep mode is performed by the application 101 of the application layer. When the sleep request is provided to the protocol control means 102 of the protocol control layer from the application 101, the protocol control means 102 performs the processing for obtaining the agreement on the transition to the sleep mode. In detail, the protocol control means 102 to which the sleep request is provided transmits the ACK frame in which the recessive is set in the sleep bit to inform other ECUs 1 of the transition to the sleep mode. Next, the protocol control means 102 determines that the agreement on the transition to the sleep mode has been obtained and transits to the sleep mode, when for all the slots related to other ECUs 1, the ACK frame in which the sleep bit is set as the recessive is received for a predetermined cycle. That is, in the present communication system, when it is determined that all the ECUs 1 transits to the sleep mode and the sleep bit is set as the recessive in all the ACK frames transmitted by each ECU 1, all the ECUs 1 transits to the sleep mode. On the other hand, when it is determined that at least one ECU 1 does not transits to the sleep mode and the ECU 1 which is not in the sleep mode does not transmit the ACK frame in which the sleep bit is set as the recessive, the ECUs 1 in the communication system does not transit to the sleep mode. The ECU 1 transiting to the sleep mode reduces the power consumption by such as a method of reducing the sampling frequency of the bit sampling by the bit sampling means 106. The ECU 1 wakes up when the message transmitted by one of other ECUs 1 is detected on the bus 5.

The protocol control means 102 of each ECU 1 performs the transmission and reception processing of the message according to the slot numbers, the processing of setting the ACK or the NAK in the ACK field in the transmitted message, the processing of retransmitting the message according to the values of the ACK field in the received message and the like, as shown in FIGS. 3A, 3B, 5, 6 and the like, in addition to performing the exceptional processings, such as the foregoing start-up sequence, re-synchronization sequence, sleep sequence and the like. The protocol control means 102 of each ECU 1 determines that the message transmitted by the protocol means 102 is normally received in the case where the protocol controller 102 does not receive the message including the response of the NAK from other ECUs 1 during one cycle after its own message transmission is completed, and the message including the response of the ACK is received from at least another ECU 1. When the protocol control means 102 determines that the message is normally received, the protocol control means 102 transmits a new message. On the other hand, when the protocol controller 102 receives at least one message including the response of the NAK from other ECUs 1 or never receives the message including the response of the ACK, the protocol control means 102 determines that the message transmitted by the protocol controller 102 is not accurately received. When the protocol control means 102 determines that the message is not accurately received, the protocol control means 102 retransmits the message. Further, even when the protocol controller 102 of each ECU 1 receives an abnormal message such as not to be able to determine the ACK/NAK from other ECUs 1, the protocol control means 102 determines that the message transmitted by the protocol controller 102 is not accurately received. When the protocol control means 102 determines that the message is not accurately received, the protocol control means retransmits the message.

Figure 11:
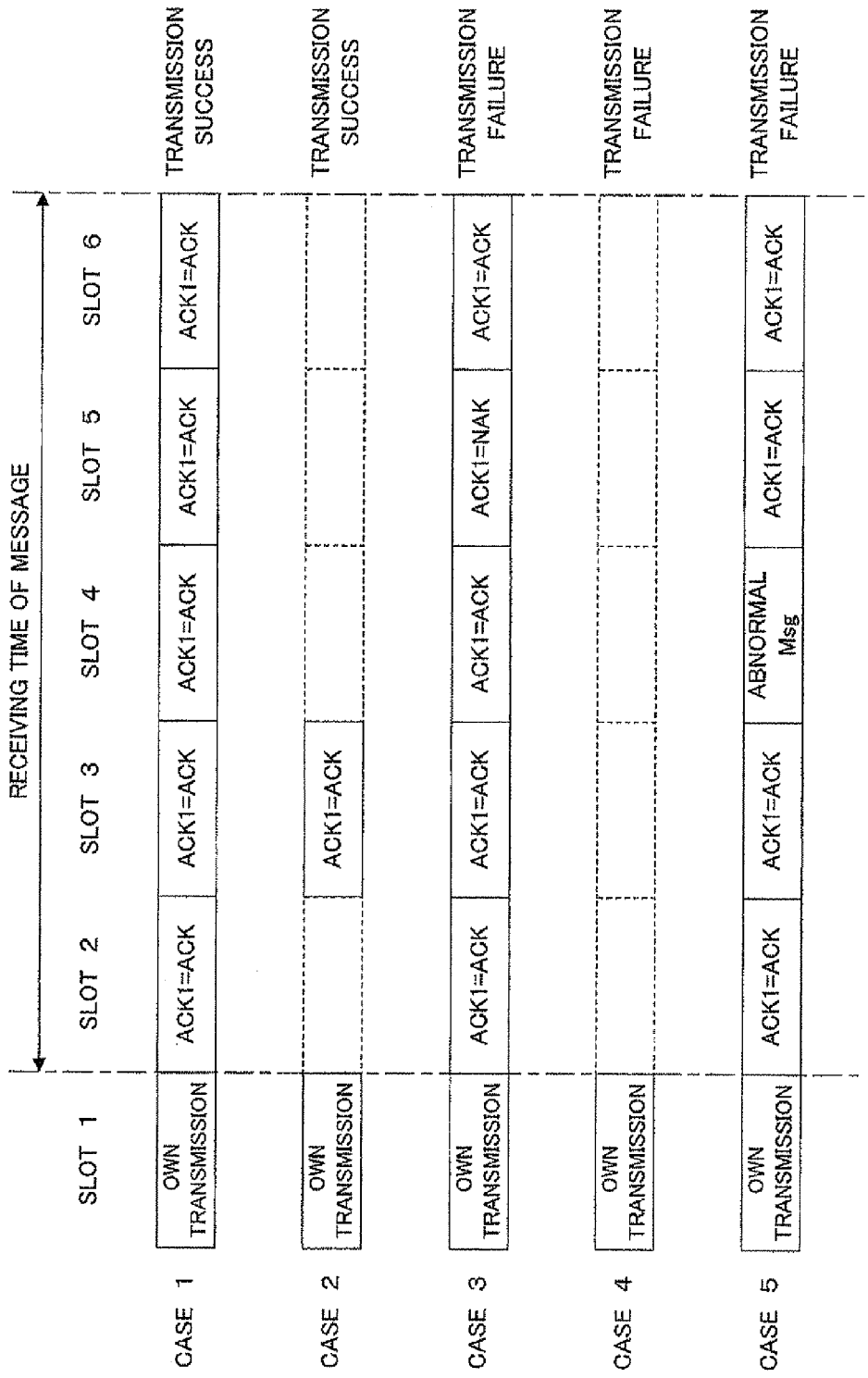
FIG. 11 is a schematic view for describing the success/failure determination of the message transmission by a protocol control means.

FIG. 11 is a schematic view for describing the success/failure determination of the message transmission by the protocol control means 102. Meanwhile, FIG. 11 illustrates the case where the ECU 1 to which the slot 1 is allocated performs the determination on the success/failure of the message transmission in the communication system in which a slot is allocated to six ECUs 1 one by one. FIG. 11 also illustrates the response result of the ACK/NAK related to the slot 1 included in the ACK field of the received message for a period of the slot 2 to slot 6.

The protocol control means 102 of the ECU 1 to which the slot 1 is allocated checks the value of the ACK 1 of the ACK field included in the received message for the period of the slot 2 to slot 6, respectively, after the message is transmitted by the protocol control means 102. The protocol control means determines that its own message transmission succeeds when the ACKs are set in ACKs 1 for all the messages (see Case 1 of FIG. 11). When the ACK is set in the message received from at least one ECU 1 and the messages from the other ECUs 1 are not received, the protocol control means 102 determines that its own message transmission has succeeded (see Case 2 of FIG. 11).

On the other hand, when NAK is set in at least one of the received messages for the period of the slot 2 to slot 6, the protocol control means 102 determines that its own message transmission has failed (see Case 3 of FIG. 11) and retransmits the message. Further, even when the messages are not received at all for the period of the slot 2 to slot 6, the protocol control means 102 determines that its own message transmission has failed (see Case 4 of FIG. 11) and retransmits the message. When the abnormal message so as not to be able to determine the ACK/NAK is received for the period of the slot 2 to slot 6, the protocol control means 102 determines that its own message transmission has failed (see Case 5 of FIG. 11) and retransmits the message.

Figure 12:
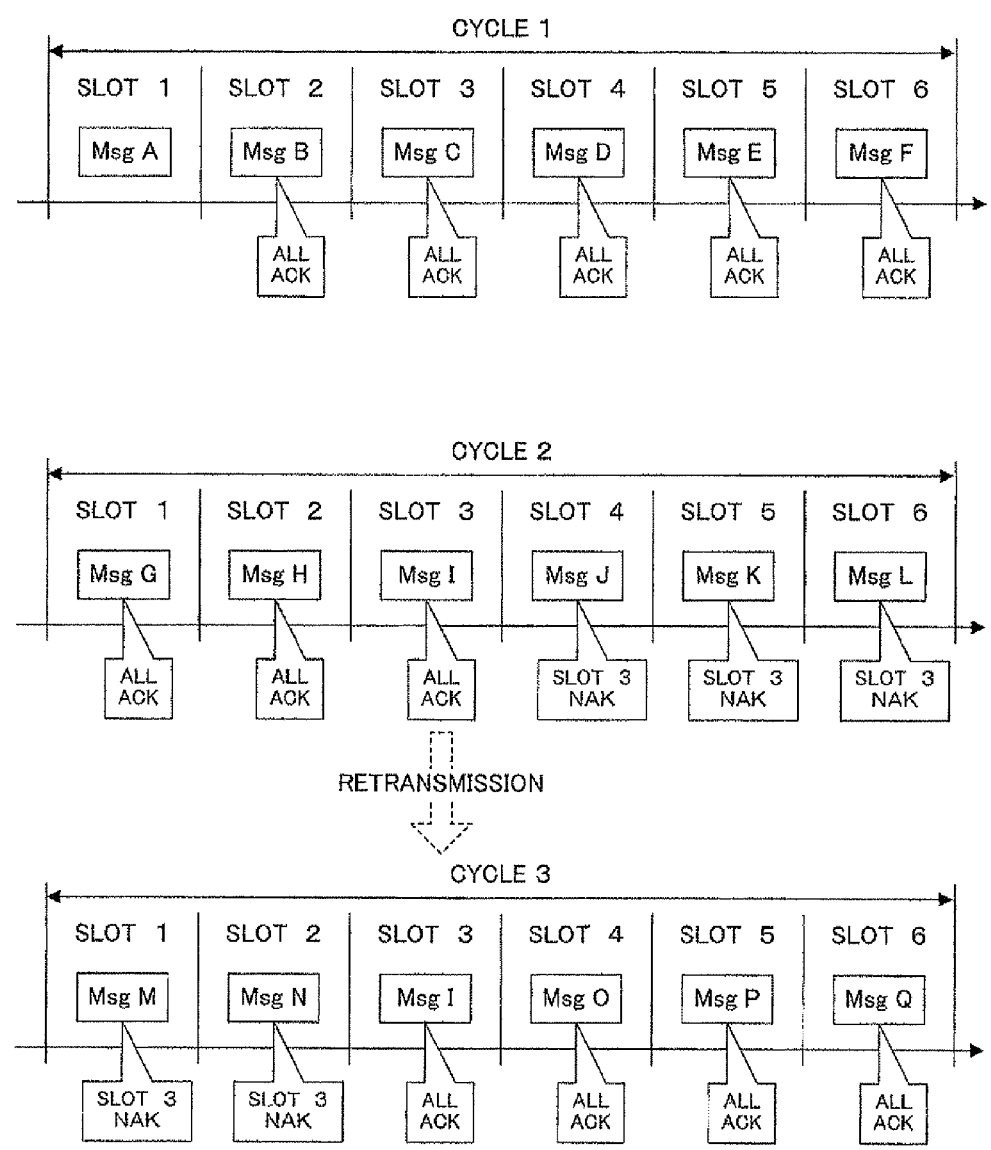
FIG. 12 is a schematic view for describing message retransmission processing by the protocol control means.
Figure 13:
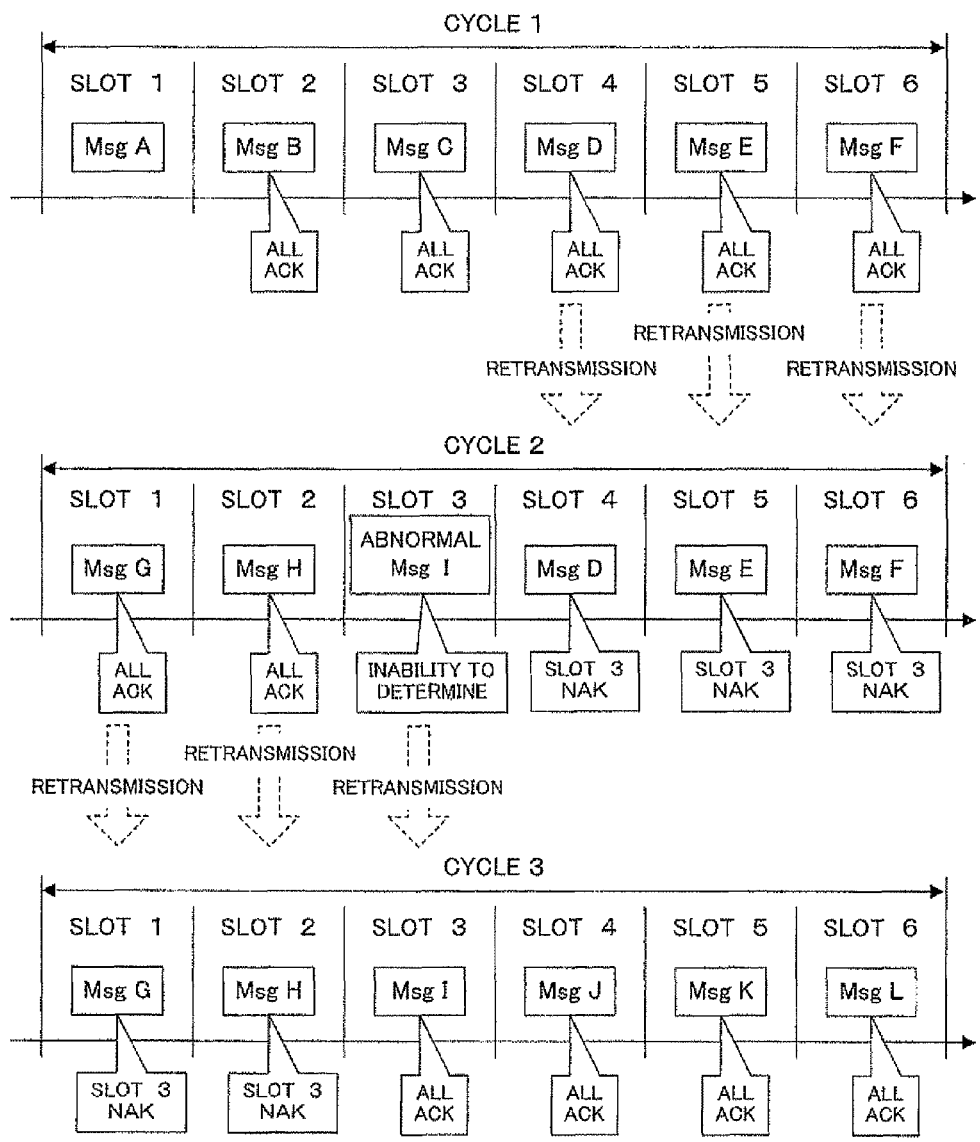
FIG. 13 is a schematic view for describing the message retransmission processing by the protocol control means.

FIGS. 12 and 13 are schematic views for describing the message retransmission processing by the protocol control means 102. Meanwhile, FIGS. 12 and 13 illustrate, in the communication system in which one cycle of communication is configured of 6 slots, messages corresponding to three cycles, transmitted and received on the bus 5 in time series.

First, in the example shown in FIG. 12, in the slots 1 to 6 of the first cycle (cycle 1) and the slots 1 and 2 of the second cycle (cycle 2), the message A to message H are accurately transmitted and received, and the ACKs are set in all the bits of the ACK field of the messages B to I. When the message I transmitted in the slot 3 of the cycle 2 is not accurately received by (all) the ECUs 1 of the receiving side, the NAK is set in a bit corresponding to the slot 3 of the ACK field of messages J to N transmitted in the slots 4 to 6 of the next cycle 2 and the slots 1 and 2 of the third cycle (cycle 3). The ECU 1 to which the slot 3 is allocated retransmits the message I in the slot 3 of cycle 3 corresponding to the NAK set in the messages J to N.

Next, in the example shown in FIG. 13, in the slots 1 to 6 of the cycle 1 and the slots 1 and 2 of the cycle 2, the messages A to H are accurately transmitted and received, and the ACKs are set in all the bits of the ACK field of the messages B to I. When the message I transmitted in the slot 3 of the cycle 2 is received by (all) the ECUs 1 of the receiving side and is an abnormal message such as not to be able to determine whether or not each bit of the ACK field is the ACK or the NAK, in the slots 4 to 6 of the next cycle 2 and the slots 1 to 3 of the cycle 3, each ECU 1 cannot determine the success/failure of reception by checking the ACK field of the message I and therefore, the messages D to I are retransmitted.

As described above, each ECU 1 in the communication system is configured to set the success/failure of the message reception from other ECUs 1 is set in the ACK field of the message to be transmitted and retransmit the message according to the ACK/NAK set in the ACK field of the received messages, such that all the ECUs 1 in the communication system can correctly receive the message.

<Error Control>

FIG. 14 is a table showing a list of communication errors detected in the communication system according to the present invention. The communication protocol of the present invention detects a staff error, a CRC error, a form error, and an ACK error as in the existing CAN protocol, but does not detect the bit error detected in the existing CAN protocol. It is noted that the ACK error of the communication protocol of the present invention is different from the ACK error of the existing CAN protocol in terms of the detection method and the like.

As in the existing CAN protocol, in the communication protocol of the present invention, when transmitting the SOF to the CRC sequence of the CRC field in the message, in the case where the same signal level is 5 bit continuous, the processing of adding the inverting data of 1 bit to the next bit is performed. This processing is referred to as the bit staff, and the staff error is an error detected when the same signal level is 6 bit continuous from the SOF to the CRC sequence in the received message.

The CRC error is an error detected when the value of the CRC sequence included in the received message is different from the value of the CRC calculated from the received message. The form error is an error detected when for a bit (CRC delimiter and EOF) in which the value is fixed to any one of the dominant and the recessive, this bit value in the received message is different from the fixed value set in advance.

The ACK error is an error detected when any one bit included in the ACK field of the received message is set as the NAK. In the existing CAN protocol, when the ACK slot of 1 bit in the message is the recessive, the ACK error is detected. When the message is received by at least one communication apparatus in the existing communication system, the ACK slot is set as the dominant. Therefore, the communication apparatus of the transmitting side cannot confirm which communication apparatus of the receiving side normally receives the message and which communication apparatus does not accurately receive the message. On the other hand, in the communication protocol of the present invention, since the ACK bit is provided in each slot allocated to each ECU 1 in the ACK field of the message, the ECU 1 of the transmitting side can individually determine whether other ECUs 1 normally receive the message by checking the ACK field of the message received in one cycle after the ECU 1 transmits the message.

Further, in the existing CAN protocol, each communication apparatus transmits a signal to the bus, and then performs the processing of detecting the signal level of the bus. When the signal level of the transmitted signal does not coincide with the detected signal level, the bit error is detected. In the communication protocol of the present invention, each ECU 1 transmits a signal, and then does not detect the signal level of the bus 5, such that the bit error is not detected.

Each ECU 1 in the communication system detects the foregoing error when each ECU 1 receives the message from other ECUs 1. When any one error is detected, the ECU 1 sets the NAK in the bit corresponding to the ACK field included in the message to be transmitted by the ECU 1 within a period of one cycle after the error is detected, and transmits the message.

Next, an operation of the error control means 103 included in the protocol control layer of the ECU 1 will be described. In the existing CAN protocol, a communication apparatus that may have a malfunction problem and the like, due to frequent errors, has a function of stopping the processing of the message transmission and reception to prevent an adverse effect on the communication system as a whole. The communication protocol of the present invention has the same function as the existing communication protocol. The control processings related to the error are performed by the error control means 103 of each ECU 1.

The error control means 130 includes two counters, that is, a transmit error counter (TEC) and a receive error counter (REC) so as to count the occurrence number of errors. FIG. 15 is a table showing fluctuation conditions of the error counter. Each ECU 1 checks the values of bits related to its own message transmission included in the ACK field of the received messages for one cycle after its own message is transmitted. Here, each ECU 1 adds 8 to the value of TEC, when the values of bits related to its own message transmission in the ACK field of the messages received from all the other ECUs 1 are NAK. Conversely, each ECU 1 subtracts 1 from the value of the TEC (however, when TEC=0, there is no fluctuation) when the values of bits related to its own message transmission in the ACK field of the messages received from all the other ECUs 1 are ACK and its own message transmission is succeeded.

Each ECU 1 adds 1 to the value of the REC when each ECU 1 detects the form error, the CRC error, or the staff error in the received message. Further, each ECU 1 detects any error in the received message and performs the determination on whether the NAK is set as the response to this message. After that, when the message determined as the NAK by each ECU 1 is determined as the ACK by other ECUs 1 on the basis of the message received from other ECUs 1, each ECU 1 adds 8 to the value of the REC.

Conversely, each ECU 1 receives one message, and then checks the ACK field included in other messages additionally received in one cycle to check whether said one message is normally received by other ECUs 1. Each ECU 1 subtracts the value of the REC when all the other ECUs 1 normally receive the message. In this case, each ECU 1 subtracts 1 from the value of the REC when 1≤REC≤127 and sets the value of the REC to 119 to 127 when REC>127 (however, when REC=0, there is no fluctuation).

Further, each ECU 1 clears the values of the TEC and the REC to zero when each ECU 1 returns from a message transmission stopping state (a bus off state, which will be described below) in which the message transmission is stopped by detecting a predetermined number of errors or more.

Figure 16:
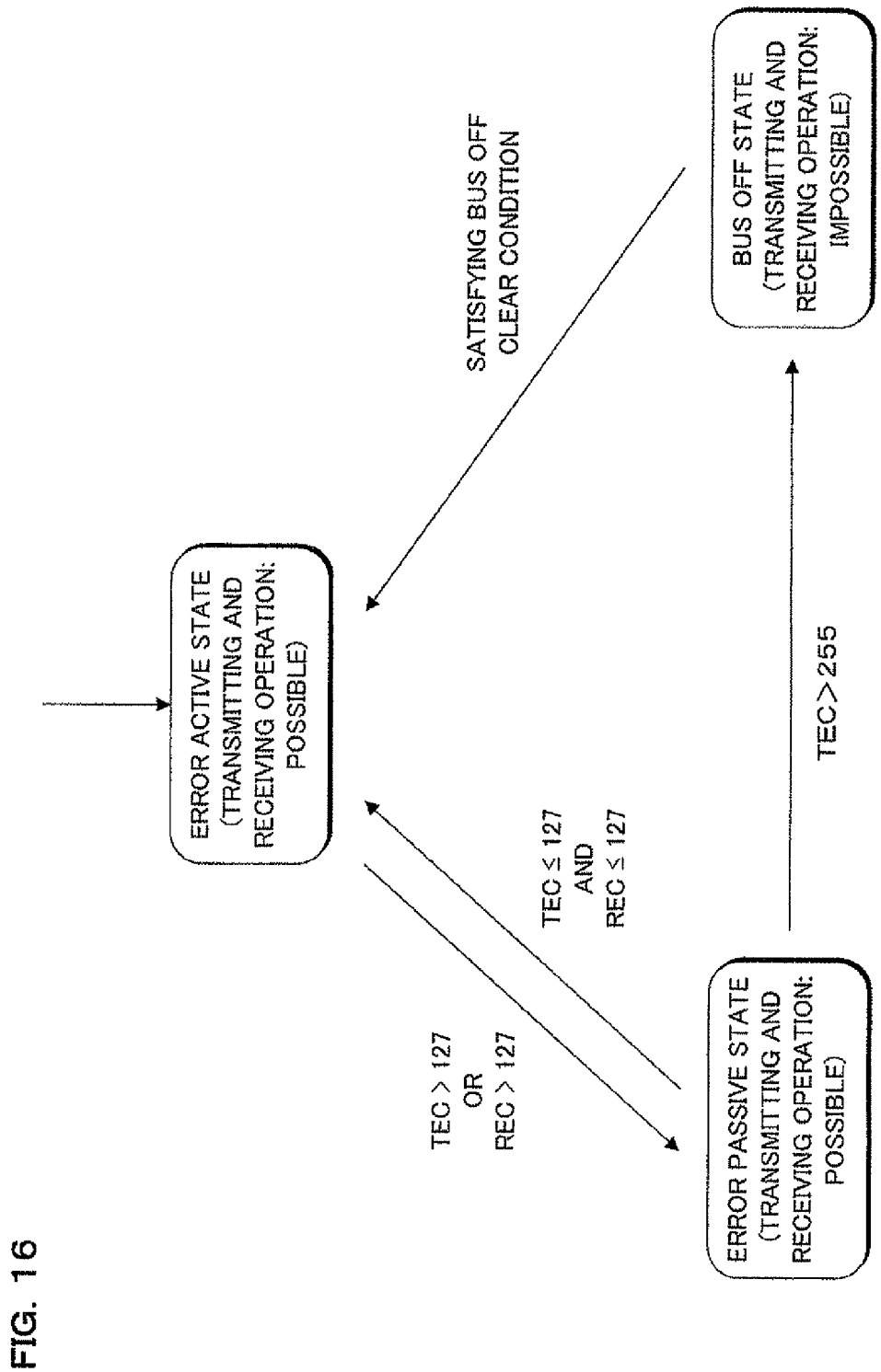
FIG. 16 is a state transition diagram for describing an operation of an error control means.

FIG. 16 is a state transition diagram for describing the operation of the error control means 103. The error control means 103 manages the state related to the error control of the ECU 1 according to the values of the two counters, that is, the TEC and the REC. The error control means 103 informs the protocol control means 102 of these states, such that the protocol control means 102 can perform the transmission and reception processings of the message suitable for the error state. There are three states related to error control, that is, an error active state, an error passive state and a bus off state. The state (that is, initial state) immediately after the ECU 1 wakes up is an error active state. Further, the values of the TEC and the REC are cleared to zero when the ECU 1 wakes up.

The error active state is a normal operation state of the ECU 1 and is a state in which the ECU 1 can transmit and receive messages without any restriction. In the error active state, the error active bit of the message transmitted by the ECU 1 is set as the dominant. In the error active state, when the value of the TEC exceeds 127 or the value of the REC exceeds 127, the error control means 103 transits from the error active state to the error passive state.

The error passive state is a state in which the message transmission is limited, since the value of the error counter exceeds a predetermined value. In the error passive state, the ECU 1 limits the message transmission so as to transmit the message related to one allocated slot only once in two cycles. Therefore, the interference between the message transmission of the ECU 1 that may have a malfunction problem and the like, and the message transmission and reception of other ECUs 1, is suppressed.

Further, in the error passive state, the error active bit of the message transmitted by the ECU 1 is set as the recessive. The ECU 1 receiving the message in which the error active bit is set as the recessive disregards (it is not considered that the message reception fails) the response of the NAK even when this NAK is set in the ACK field of this message and performs the processing. Even in the case where the received message is the message in which the error active flag is set as the recessive, when the received message is a message in which the ACK is set in the ACK field, the ECU 1 receiving the message performs the same processing as the case where the message in which the general ACK is set is received. That is, in the communication protocol of the present invention, the message is used as the substitution of the error frame (a passive error flag) of the existing CAN protocol by setting the error active bit of the message as the recessive and setting the ACK field as the NAK.

In the error passive state, when the values of the TEC and the REC are set to be 127 or less, the error control means 103 transits from the error passive state to the error active state. Further, in the error passive state, when the value of the TEC exceeds 255, the error control means 103 transits from the error passive state to the bus off state.

It is considered that the ECU 1 reaches an abnormal state such as a system failure when the value of the error counter is further increased and exceeds a predetermined value, and the ECU 1 is prohibited from transmitting the message. The bus off state is the state in which the message transmission is prohibited in this manner. Therefore, the ECU 1 in the bus off state cannot transmit and receive the messages at all until the predetermined condition in which the bus off state is released is satisfied. In the ECU 1 of the bus off state, when the request of the bus off clear is provided to the protocol control means 102 from the application 101 (when the bus off clear condition is established), the error control means 103 transits from the bus off state to the error active state and clears the values of the TEC and the REC.

Each ECU 1 of the present invention performs the foregoing error control processing to achieve an equivalent error control to the existing CAN protocol.

<Details of Protocol Control>

Figure 17:
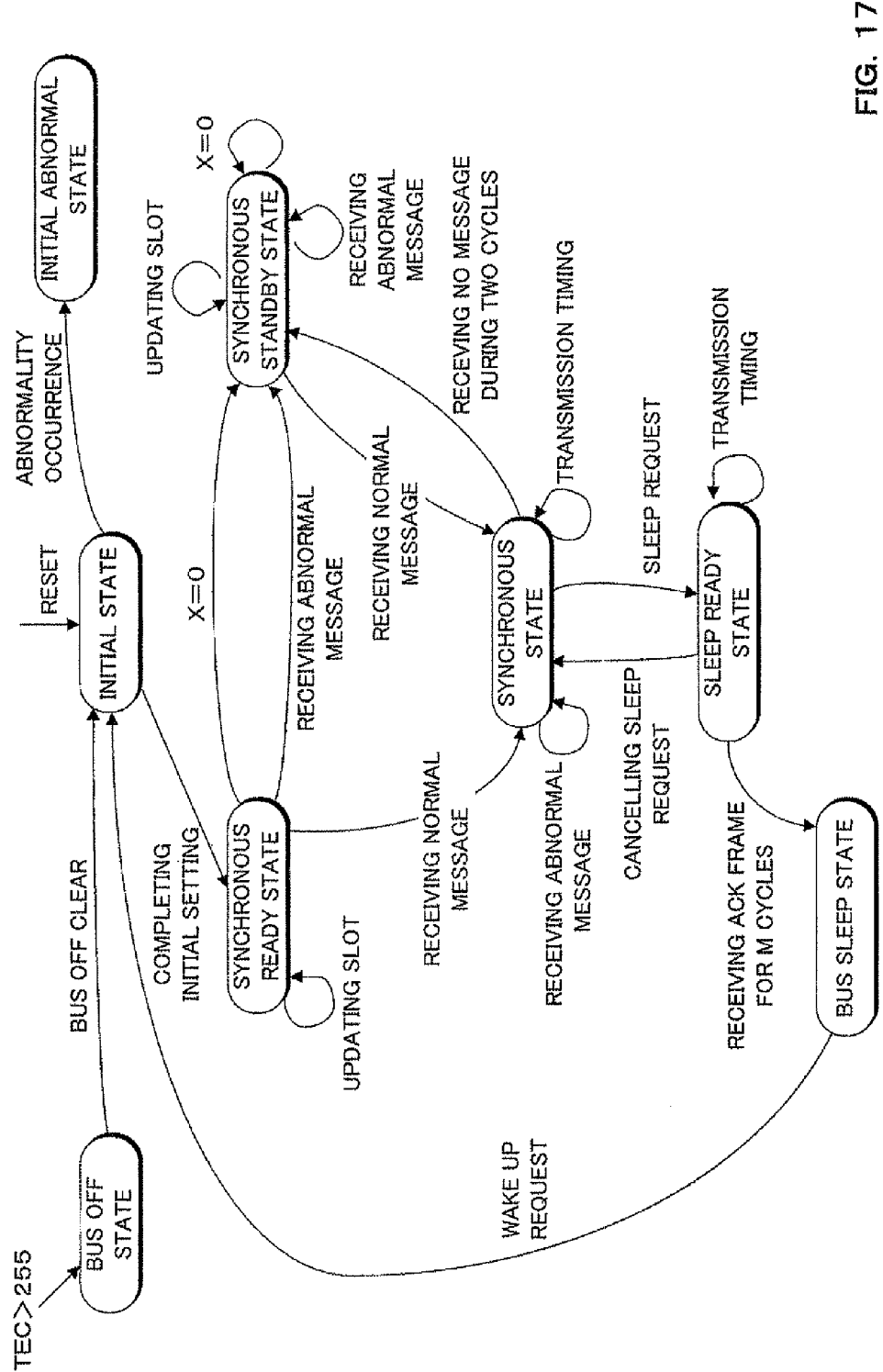
FIG. 17 is a state transition diagram for describing an operation related to communication control processing of an ECU.

Next, the details of the control processing by the communication protocol of the present invention will be described with reference to the state transition diagram. FIG. 17 is a state transition diagram for describing an operation related to communication control processing of an ECU 1. Meanwhile, in the following description, "X" represents the value of the counter used in the start-up of the communication processing and the value of the counter X is subtracted according to the update of the slot counter. When the value of the counter X becomes zero, the ECU 1 retransmits the messages. The counter X corresponds to the time measuring means for measuring the standby time up to the message transmission. Further, "N" represents the number of slots of one cycle and "i" represents the minimum number among the slot numbers allocated to ECUs 1 respectively.

In the communication protocol of the present invention, each ECU 1 transits to eight operation states, that is, an initial state, an initial abnormal state, a synchronous ready state, a synchronous standby state, a synchronous state, a sleep ready state, a bus sleep state, and a bus off state to perform the communication control processing. The initial state is a state before the ECU 1 starts communication. The ECU 1 is in the initial state after a power-on reset to the apparatus, after the reset signal is input thereto or the like. In the initial state, the ECU 1 acquires the required information (the number of slots, the slot number and the like) for communication by the input from an external device or by reading the previously stored data and completes the initial setting. After completion of the initial setting, the ECU 1 transits to the synchronous ready state so as to synchronize the communication with other ECUs 1. However, the ECU 1 transits from the initial state to the initial abnormal state when the abnormality occurs in the initial state, the initial setting fails or the like, and stands by in the initial abnormal state.

Figure 18:
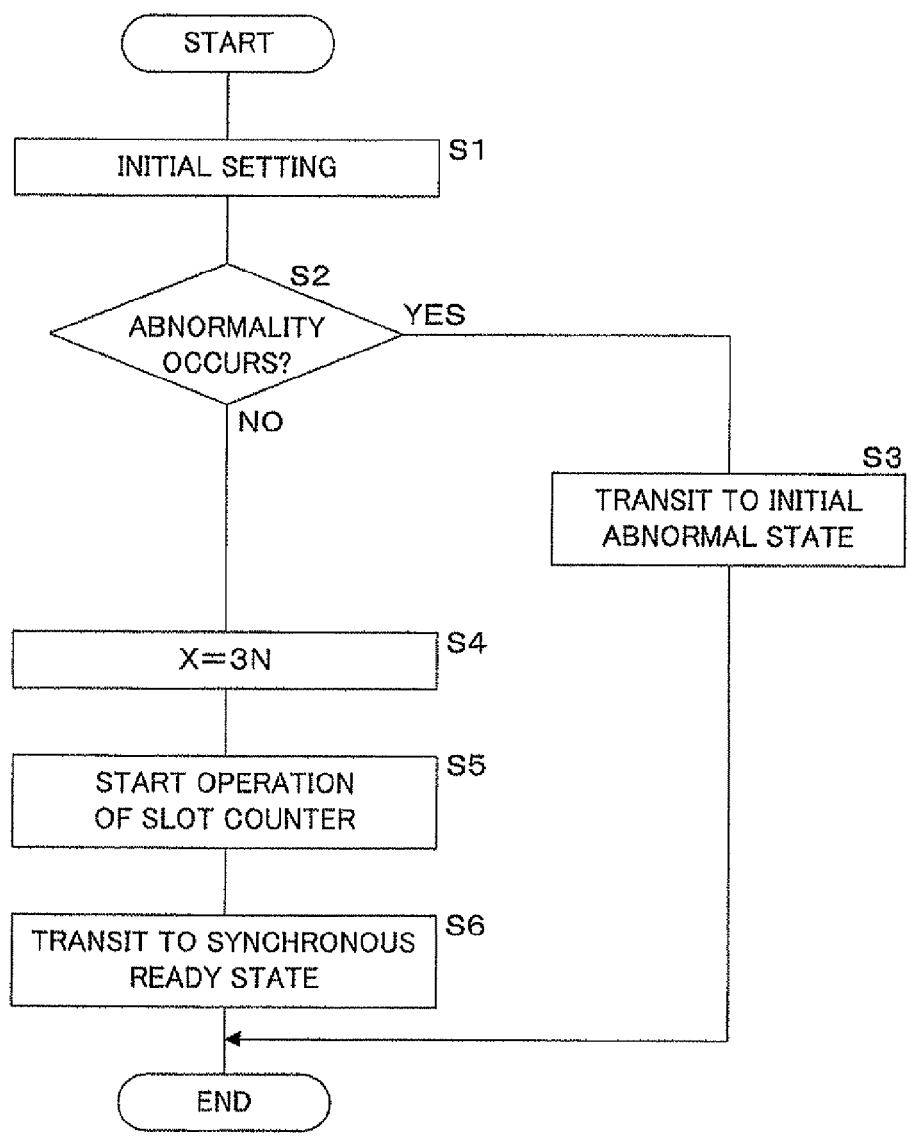
FIG. 18 is a flow chart illustrating a processing procedure of the ECU in an initial state.

FIG. 18 is a flow chart illustrating the processing procedure of the ECU 1 in the initial state. Meanwhile, in the flow chart shown in FIGS. 18 to 26, the exceptional processing such as the processing of transiting to the initial state when the reset signal is input, and the processing of transiting to the bus off state when the bus off condition is established are not shown.

The processings illustrated in the flow charts of FIGS. 18 to 26 are processings performed by the protocol control means 102 of the protocol control layer of the ECU 1.

The ECU 1 being in the initial state first acquires the information, such as the number of slots, the slot number and the like, to perform the initial setting (step S1). Next, the ECU 1 determines whether or not an abnormality occurs in the initial setting (step S2) and when the abnormality occurs (YES in S2), the ECU 1 designates the transition to the initial abnormal state (step S3), and ends the processing. When the abnormality does not occur and the initial setting is completed (No in S2), the ECU 1 sets the value of the counter X to 3N (step S4), starts the operation of the slot counter (step S5), transits to the synchronous ready state (step S6), and ends the processing of the initial state.

The synchronous ready state is a state confirming whether or not other ECUs 1 have transmitted the message in advance. The ECU 1 in the synchronous ready state consistently receives the messages during two cycles to the maximum. The ECU 1 checks whether or not the message is transmitted on the bus 5. When the ECU 1 detects the message transmitted by other ECUs 1, performs the reception processing so as to synchronize with the received message. That is, when the ECU 1 normally receives the message, the ECU 1 transits to the synchronous state and performs the following processing in synchronization with the received message. When the ECU 1 does not normally receive the message (that is, when the ECU 1 receives an abnormal message), the ECU 1 transits to the synchronous standby state and resets the counter "X" so as to wait for the normal message reception. When other ECUs 1 do not start the message transmission and the ECU 1 does not detect the messages on the bus 5 during two cycles (when the counter "X" becomes zero), the ECU 1 transits to the synchronous ready state so as to start its own transmission of message, and transmits the ACK frame in the synchronous standby state.

Figure 19:
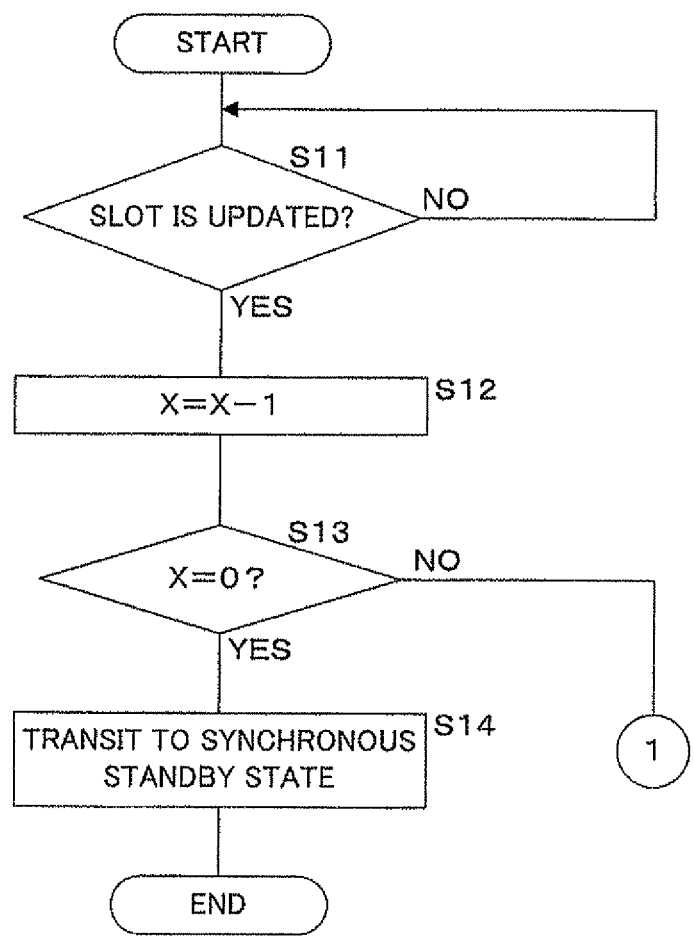
FIG. 19 is a flow chart illustrating a processing procedure of the ECU in a synchronous ready state.
Figure 20:
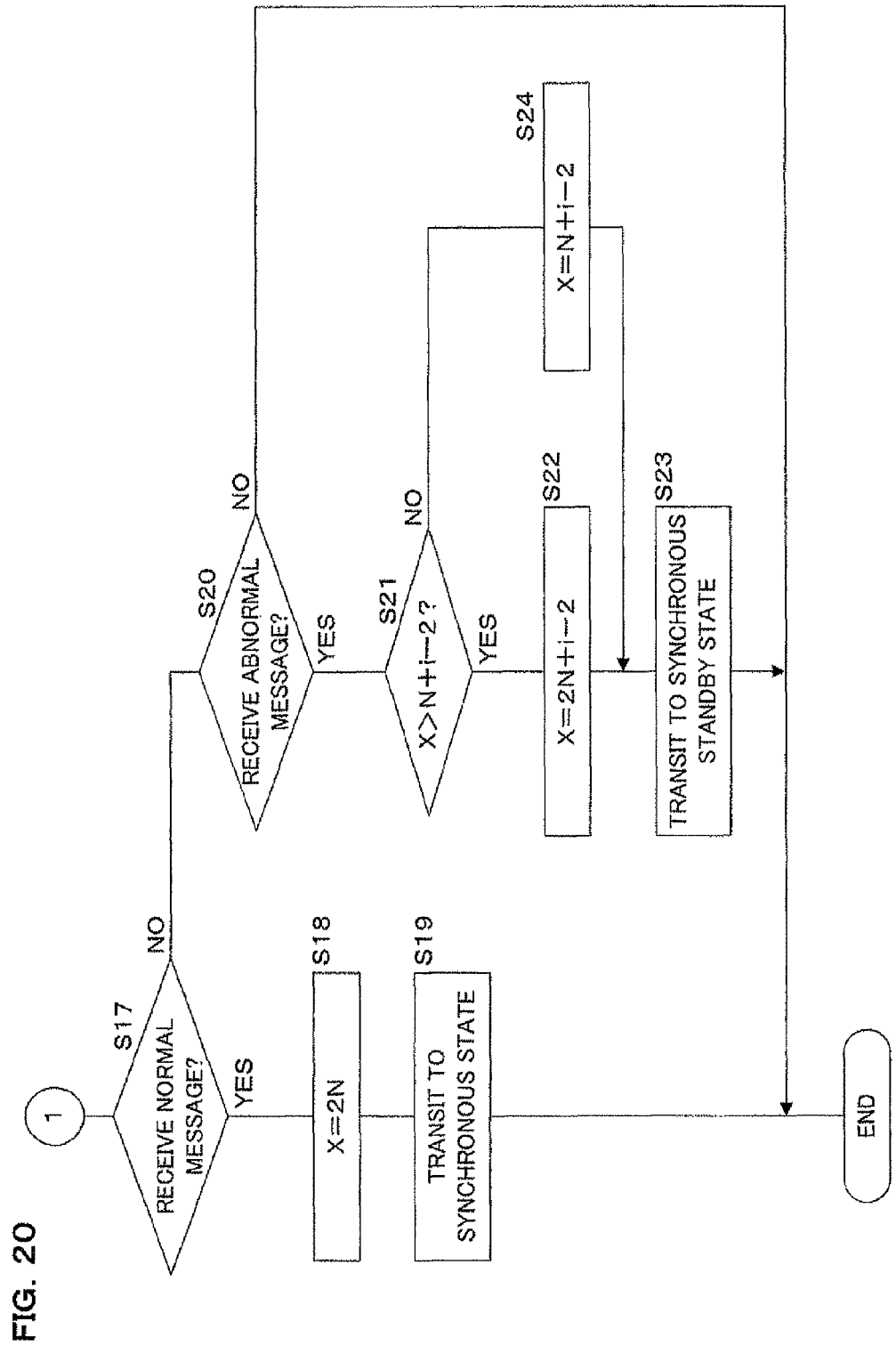
FIG. 20 is a flow chart illustrating the processing procedure of the ECU in the synchronous ready state.

FIGS. 19 and 20 are flow charts illustrating the processing procedure of the ECU 1 in the synchronous ready state, and the ECU 1 repeatedly performs the processing shown in FIGS. 19 and 20 in the synchronous ready state. In the synchronous ready state, the ECU 1 checks the value of the slot counter to determine whether or not the slot is updated (whether or not the slot number is changed) (step S11). When the slot is not updated (NO in S11), the ECU 1 waits until the slot is updated. When the slot is updated (YES in S11), the ECU 1 subtracts 1 from the value of the counter X (step S12) and further determines whether or not the value of the counter X is zero (step S13). When the value of the counter X is zero (YES in S13), that is, when the value of the counter X reaches zero without the message reception, the ECU 1 transits to the synchronous standby state (step S14) and ends the processing of the synchronous ready state. (The ECU 1 transits to the synchronous standby state, and then transmits the ACK frame).

When the value of the counter X is not zero (NO in S13), it is determined whether or not the ECU 1 receives a normal message (step S17). When the ECU 1 does not receive the normal message (NO in S17), it is further determined whether or not the ECU 1 receives the abnormal message (step S20). When the ECU 1 does not receive the abnormal message (NO in S20), that is, when the ECU 1 does not receive the messages from other ECUs 1 at all, the ECU 1 ends the processing (however, the illustrated processings are repeatedly performed in the synchronous ready state and the processing of the ECU 1 returns to step S11).

When the ECU 1 receives the normal message (YES in S17), the ECU 1 sets the value of the counter X to 2N (step S18), transits to the synchronous state (step S19), and ends the processing of the synchronous ready state. When the ECU 1 receives the abnormal message (YES in S20), the ECU 1 further determines whether or not the value of the counter X is larger than (N+i−2) (step S21). When the value of the counter X is larger than (N+i−2) (YES in S21), the ECU 1 sets the value of the counter X to (2N+i−2) (step S22), transits to the synchronous standby state (step S23), and ends the processing of the synchronous ready state. When the value of the counter X is (N+i−2) or less (NO in S21), the ECU 1 sets the value of the counter X to (N+i−2) (step S24), transits to the synchronous standby state (step S23), and ends the processing.

The synchronous standby state is a state in which waits for the message reception from other ECUs 1, and when the ECU 1 receives normally the message from other ECUs 1, the ECU 1 starts the processing in synchronization with the received message and transits to the synchronous state. When the ECU 1 receives the abnormal message in the synchronous standby state, the ECU 1 waits for the retransmission of the received message. In addition, when the ECU 1 does not receive the message from other ECUs 1 at all (when the counter "X" becomes zero) in the synchronous standby state, the ECU 1 transmits the ACK frame. Further, in the synchronous ready state, when the value of the counter X becomes zero such that the ECU 1 transits to the synchronous standby state, the ECU 1 first transmits the ACK frame.

Figure 21:
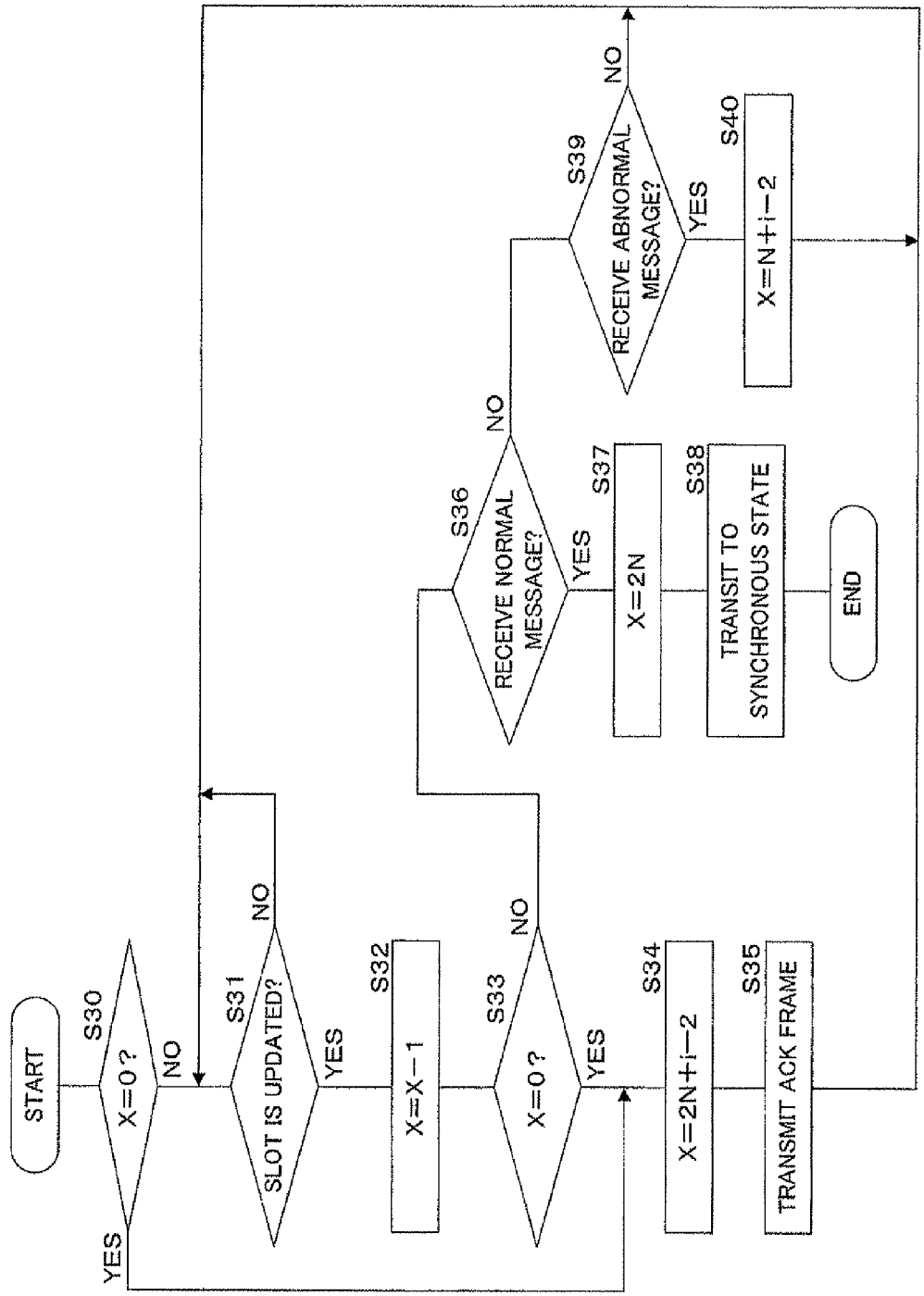
FIG. 21 is a flow chart illustrating the processing procedure of the ECU in a synchronous standby state.

FIG. 21 is a flow chart illustrating the processing procedure of the ECU 1 in the synchronous standby state. The ECU 1 being in the synchronous standby state first checks whether or not the value of the counter X is zero (step S30) and therefore, it is determined that the ECU 1 transits to the synchronous standby state due to that the value of the counter X becomes zero in the synchronous ready state. When the value of the counter X is zero (YES in S30), the ECU 1 sets the value of the counter X to (2N+i−2) (step S34) and transmits the ACK frame (step S35) and progresses the processing to step S31. When the value of the counter X is not zero (NO in S30), the ECU 1 progresses the processing to step S31.

In step S31, the ECU 1 in the synchronous standby state checks the value of the slot counter to determine whether or not the slot is updated (step S31), and when the slot is not updated (NO in S31), the ECU 1 waits until the slot is updated. When the slot is updated (YES in S31), the ECU 1 subtracts 1 from the value of the counter X (step S32) and further determines whether or not the value of the counter X is zero (step S33). When the value of the counter X is zero (YES in S33), the ECU 1 sets the value of the counter X to (2N+i−2) (step S34), transmits the ACK frame (step S35), and returns the processing to step S31.

When the value of the counter X is not zero (NO in S33), it is determined whether or not the ECU 1 receives a normal message (step S36). When the ECU 1 does not receive the normal message (NO in S36), it is further determined whether or not the ECU 1 receives the abnormal message (step S39). When the ECU 1 does not receive the abnormal message (NO in S39), the ECU 1 returns the processing to step S31.

When the ECU 1 receives the normal message (YES in S36), the ECU 1 sets the value of the counter X to 2N (step S37), transits to the synchronous state (step S38), and ends the processing of the synchronous standby state. When the ECU 1 receives the abnormal message (YES in S39), the ECU 1 sets the value of the counter X to (N+i−2) (step S40) and returns the processing to step S31.

The synchronous state is a state in which the ECU 1 is synchronized with at least another ECU 1 and the ECU 1 transmits the message (the data frame or ACK frame) in the slot allocated thereto. Further, the synchronous state has two states, that is, the error active state or the error passive state according to the values of the TEC and the REC. The message transmission is limited to once in two cycles in the error passive state. The ECU 1 operates in this synchronous state in the normal operation state. When the ECU 1 does not receive the message from all the other ECUs 1 at all during two cycles, the ECU 1 transmits the ACK frame and transits to the synchronous standby state. When the sleep request is provided from the application 101 of the application layer, the ECU 1 transits to the sleep transition state. In addition, the ECU 1 transits to the initial state according to the input of the reset signal, and transits to the bus off state according to the establishment of the bus off condition.

Figure 22:
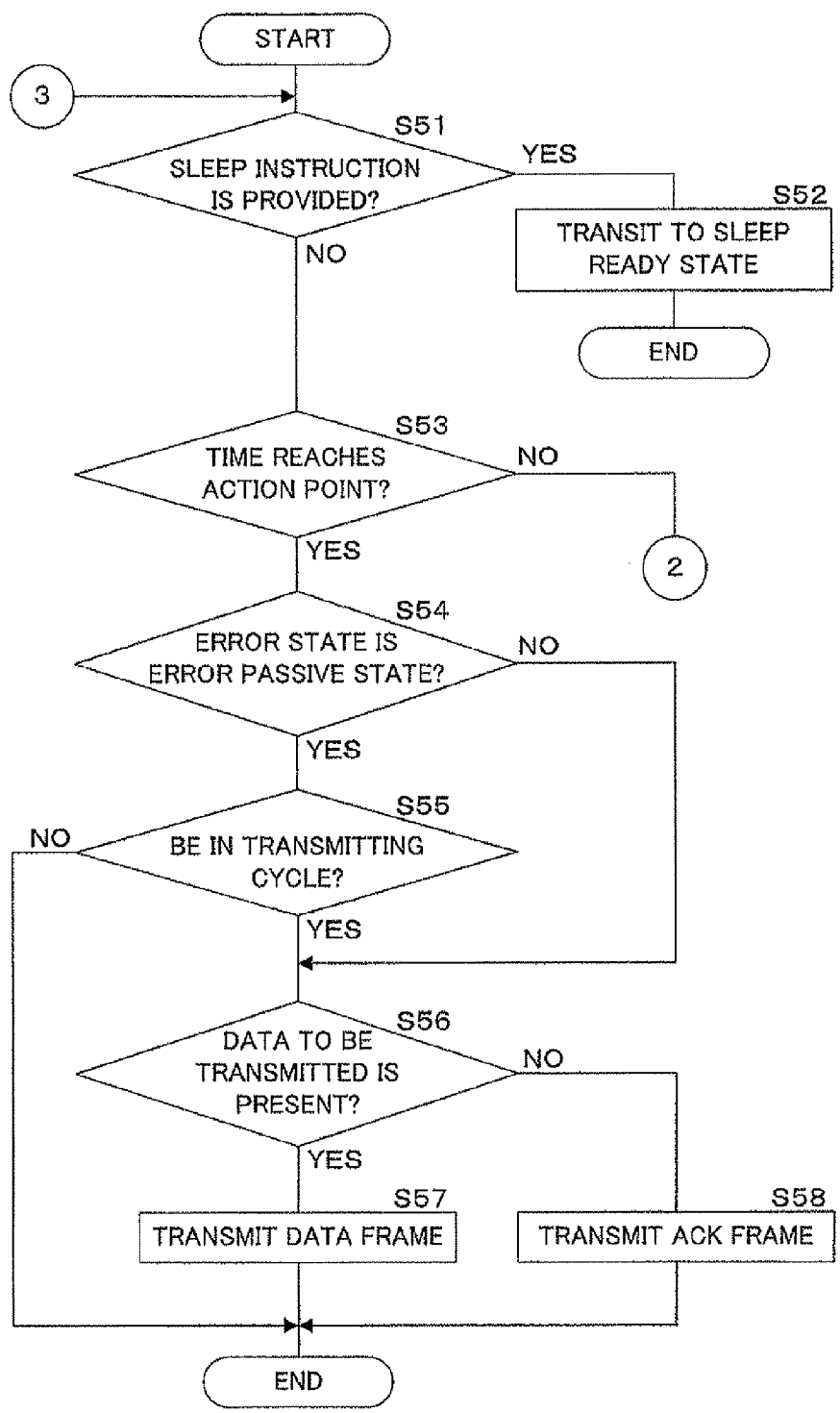
FIG. 22 is a flow chart illustrating the processing procedure of the ECU in a synchronous state.
Figure 23:
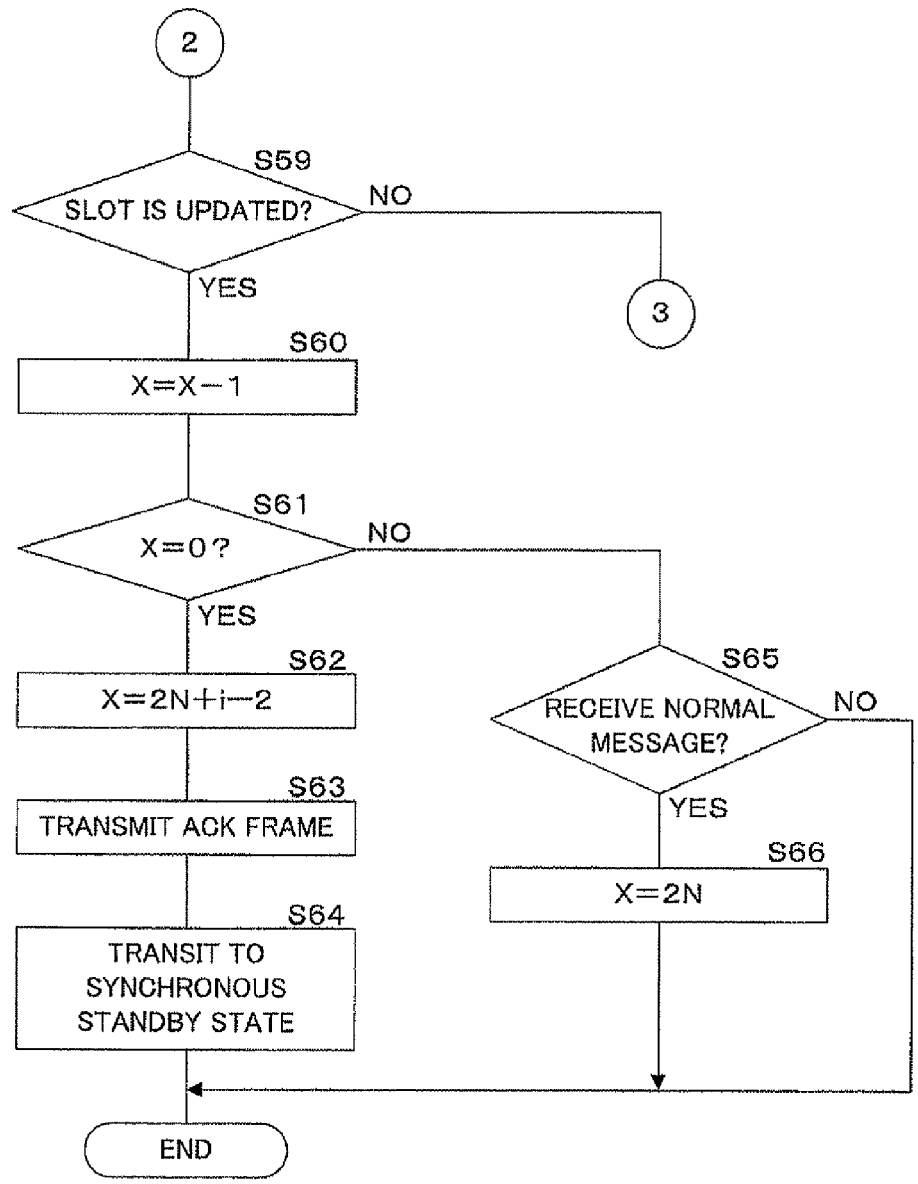
FIG. 23 is a flow chart illustrating the processing procedure of the ECU in the synchronous state.

FIGS. 22 and 23 are flow charts illustrating the processing procedure of the ECU 1 in the synchronous state, and the ECU 1 repeatedly performs the processing shown in FIGS. 22 and 23 in the synchronous state. In the synchronous state, the ECU 1 determines whether or not the sleep instruction is provided from the application 101 (step S51) and when the sleep instruction is provided (YES in S51), the ECU transits to the sleep ready state (step S52) and ends the processing of the synchronous state.

When the sleep instruction is not provided from the application 101 (NO in S51), the ECU 1 determines whether or not time reaches the action point of the slot allocated to the ECU 1 (step S53). When time reaches the action point (YES in S53), the ECU 1 further determines whether or not the error state of the ECU 1 is the error passive state (step S54). When the error state is the error passive state, the message transmission is limited to once in two cycles. Therefore, when the error state is the error passive state (YES in S 54), it is further determined whether or not the ECU 1 itself is in a cycle that can transmit the message (step S55). When it is determined that the ECU 1 is not in the cycle that can transmit the message (NO in S55), the ECU 1 ends the processing (however, the illustrated processing is repeatedly performed in the synchronous state and the processing of the ECU 1 returns to step S51).

When the error state is not the error passive state (NO in S54), that is, when the error state is the error active state or when the ECU 1 in the error passive state is in a cycle that can transmit the message (YES in S55), the ECU 1 checks whether or not data to be transmitted to other ECUs 1 is present (step S56). When data to be transmitted to other ECUs 1 is present (YES in S56), the ECU 1 creates and transmits the data frame including this data (step S57) and ends the processing. Further, when data to be transmitted to other ECUs 1 is not present (NO in S56), the ECU 1, creates and transmits the ACK frame (step S58), and ends the processing.

When time does not reach the action point of the slot allocated to the ECU 1 (NO in S53), the ECU 1 checks the value of the slot counter to determine whether or not the slot is updated (step S59). When the slot is not updated (NO in S59), the ECU 1 returns the processing to step S51 and repeatedly performs the determination of steps S51, S53, and S59 until the sleep instruction is provided to the ECU 1, until time reaches the action point, or until the slot is updated.

When the slot is updated (YES in S59), the ECU 1 subtracts 1 from the value of the counter X (step S60) and further determines whether or not the value of the counter X is zero (step S61). When the value of the counter X is zero (YES in S61), the ECU 1 sets the value of the counter X to (2N+i−2) (step S62), transmits the ACK frame (step S63), transits to the synchronous standby state (step S64), and ends the processing of the synchronous state. When the value of the counter X is not zero (NO in S61), it is determined whether or not the ECU 1 receives the normal message (step S65). When the ECU 1 receives the normal message (YES in S65), the ECU 1 sets the value of the counter X to 2N (step S66) and ends the processing. When the ECU 1 does not receive the normal message (NO in S65), that is, when the ECU 1 receives the abnormal message or does not receive the message, the ECU 1 ends the processing.

In the sleep ready state, when the sleep request is provided from the application 101 and the agreement on the sleep with other ECUs 1 is obtained or when the sleep request from the application 101 is canceled, the ECU 1 transits to another state. In the sleep ready state, the ECU 1 cannot transmit the data frame and transmits only the ACK frame in which the sleep bit is set as the recessive. When the ECU 1 receives the ACK frame in which the sleep bit is set as the recessive from other ECUs 1 for M (predetermined integer) cycles, the ECU 1 transits to the bus sleep state. When the cancel of the sleep request is provided from the application 101, the ECU 1 transits to the synchronous state.

Figure 24:
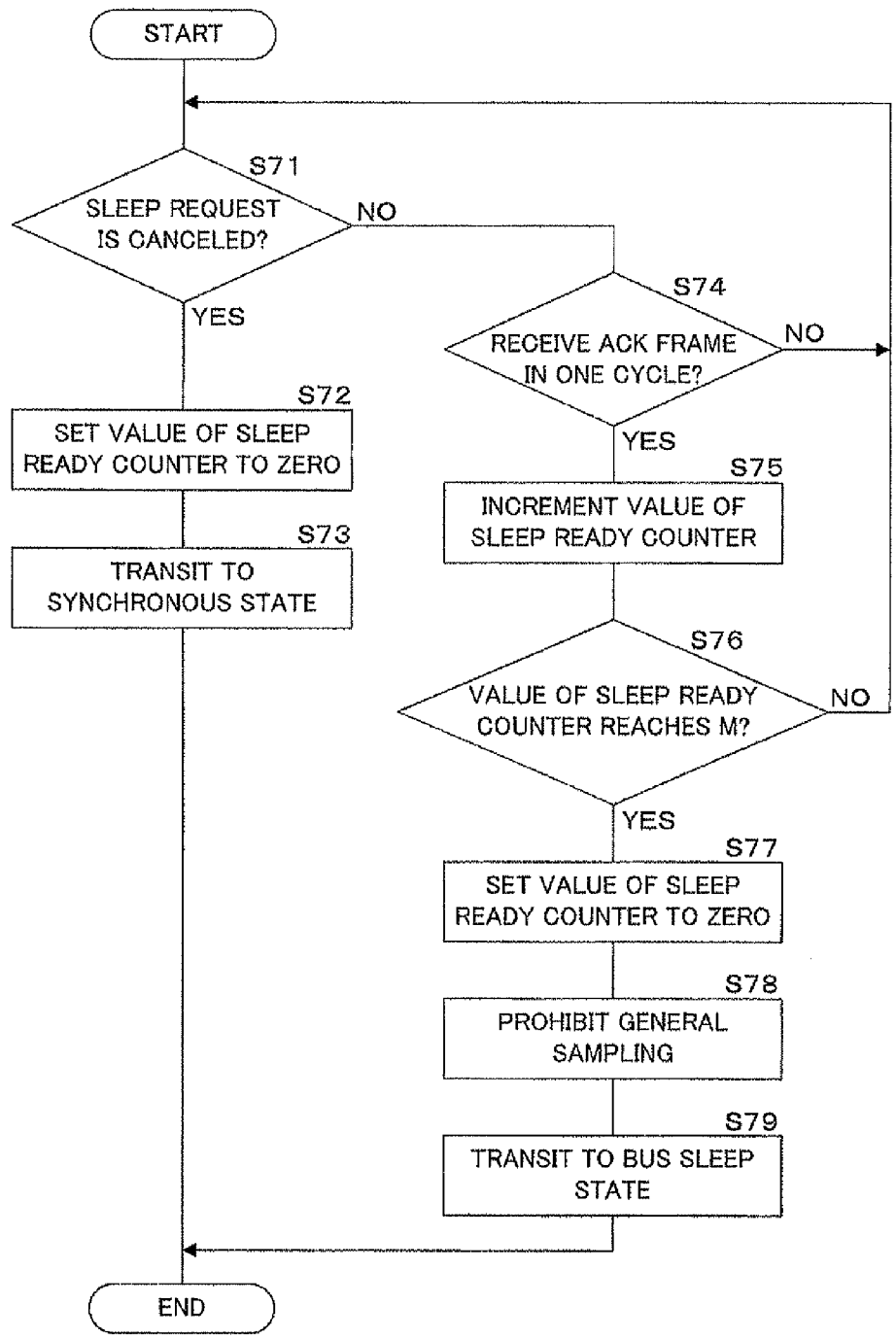
FIG. 24 is a flow chart illustrating the processing procedure of the ECU in a sleep ready state.

FIG. 24 is a flow chart illustrating the processing procedure of the ECU 1 in the sleep ready state. Meanwhile, in the illustrated processing, the ECU 1 performs the processing using the sleep ready counter, but the value of this counter is initialized to zero at the time of the initial setting and the like. First, the ECU 1 being in the sleep ready state determines whether or not the sleep request from the application 101 is canceled (step S71). When the sleep request is not canceled (NO in S71), the ECU 1 determines whether the ACK frame is received from other ECUs 1 in one cycle (step S74). When the ECU 1 does not receive the ACK frame in one cycle (NO in S74), the ECU 1 returns the processing to step S71 and repeatedly performs the determination of steps S71 and S74 when the sleep request is canceled or until the ACK frame is received in one cycle.

When the sleep request is canceled by the application 101 (YES in S71), the ECU 1 sets the value of the sleep ready counter to zero (step S72), transits to the synchronous state (step S73), and ends the processing of the sleep ready state.

When the ECU 1 receives the ACK frame in one cycle (YES in S74), the ECU 1 increments the value of the sleep ready counter (step S75) to determine whether or not the value of the sleep ready counter reaches the predetermined M (step S76). When the value of the sleep ready counter does not reach the M (NO in S76), the ECU 1 returns the processing to step S71 and repeatedly performs the foregoing processings. When the value of the sleep ready counter reaches the M (YES in S76), the ECU 1 sets the value of the sleep ready counter to zero (step S77). Next, the ECU 1 prohibits the general sampling by the bit sampling means 106 (step S78), that is, the ECU 1 performs the power saving setting such as the reduction in the frequency of sampling performed by the bit sampling means 106. After the ECU 1 prohibits the general sampling, the ECU 1 transits to the bus sleep state (step S79), and ends the processing of the sleep ready state.

The bus off state is a state transited to the case where the bus off condition that TEC>255 in all the other states is established. The ECU 1 being in the bus off state waits until the bus off condition is cleared. When the bus off condition is cleared, the ECU 1 transits to the initial state.

Figure 25:
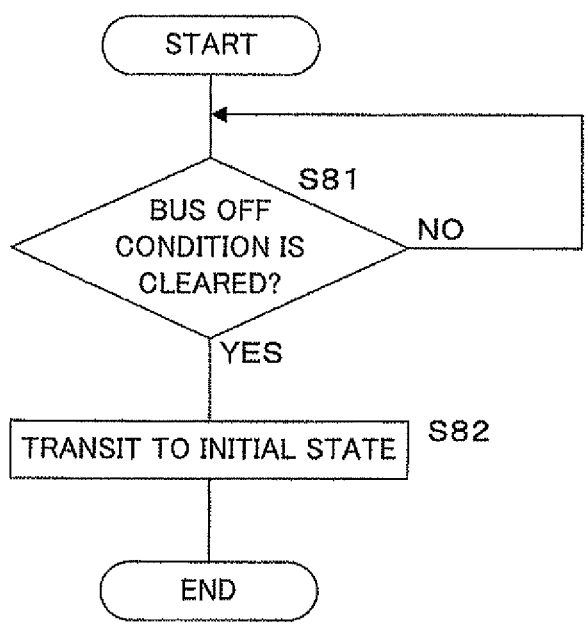
FIG. 25 is a flow chart illustrating the processing procedure of the ECU in a bus off state.

FIG. 25 is a flow chart illustrating the processing procedure of the ECU 1 in the bus off state. The ECU 1 transiting from another state to the bus off state due to that the bus off condition of TEC>255 is established determines whether or not the bus off condition is cleared (whether the bus off condition is not established) (step S81). When the bus off condition is not cleared (NO in S81), the ECU 1 waits until the bus off condition is cleared. When the bus off condition is cleared (YES in S81), the ECU 1 transits to the initial state (step S82) and ends the processing of the bus off state.

When the agreement on the sleep is established between the ECU 1 and other ECUs 1 in the communication system, the ECU 1 is in a lower power consumption state in which the power is saved by such as the reduction in the sampling frequency. The bus sleep state is a state in which the ECU 1 monitors the bus 5 in the lower power consumption state. In the bus sleep state, the ECU 1 does not transmit the message. In the bus sleep state, when the ECU 1 detects the dominant (the wake up request) on the bus 5 or when the sleep request is canceled by the application 101, the ECU 1 performs the returning processing from the low power consumption state such as returning the sampling frequency to the general frequency and transits to the initial state.

Figure 26:
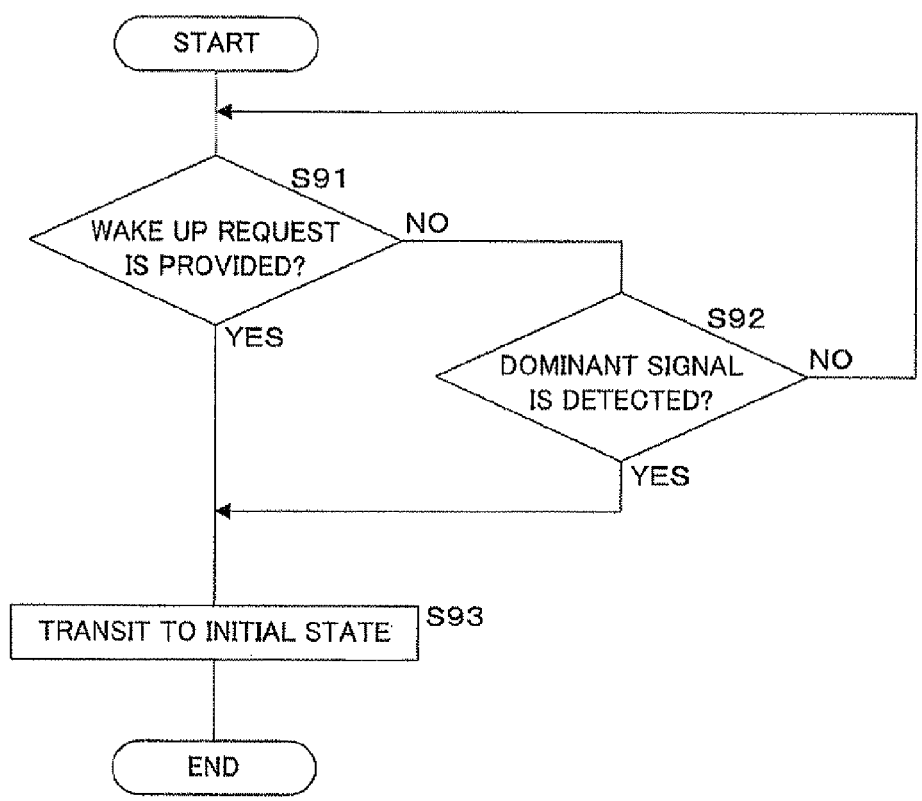
FIG. 26 is a flow chart illustrating the processing procedure of the ECU in the bus sleep state.

FIG. 26 is a flow chart illustrating the processing procedure of the ECU 1 in the bus sleep state. The ECU 1 being in the bus sleep state determines whether or not the wake up request is provided from the application 101 (step S91). When the wake up request is not provided (No in S91), the ECU 1 further determines whether the dominant signal is detected on the bus 5 (step S92). When the dominant signal is not detected (NO in S92), the ECU 1 returns the processing to step S91 and repeats the determination processing when the wake up request is provided or until the dominant signal is detected.

When the wake up request is provided from the application 101 (YES in S91) or when the dominant signal is detected on the bus 5 (YES in S92), the ECU 1 transits to the initial state (step S93) and ends the processing of the bus sleep state.

<Start-Up Sequence>

Next, some examples of the start-up sequence performed by each ECU 1 in the communication system according to the present invention will be described. Each ECU 1 in the communication system according to the present invention wakes up and transits from the initial state to the synchronous ready state, and then only receives the messages for the period of three cycles so as to determine whether or not other ECUs 1 starting the message transmission in advance are present. When the ECU 1 receives the normal message from other ECUs 1 during this period, the ECU 1 is synchronized with the slot number included in the received message and transits to the synchronous state to generally transmit and receive the messages. When the ECU 1 receives the abnormal message during this period, the ECU 1 regards the slot related to the reception of the abnormal message as a first slot (slot 1) in the cycle, transits to the synchronous standby state, sets a value in the counter X used as a timer, and then waits for the message retransmission in the following cycle. When the ECU 1 does not receive the message from other ECUs 1 during this period, the ECU 1 transmits the ACK frame, sets a value in the counter X, regards the slot in which the ECU 1 transmits the message as the slot 1, transits to the synchronous standby state and waits for the response from other ECUs 1.

Figure 27:
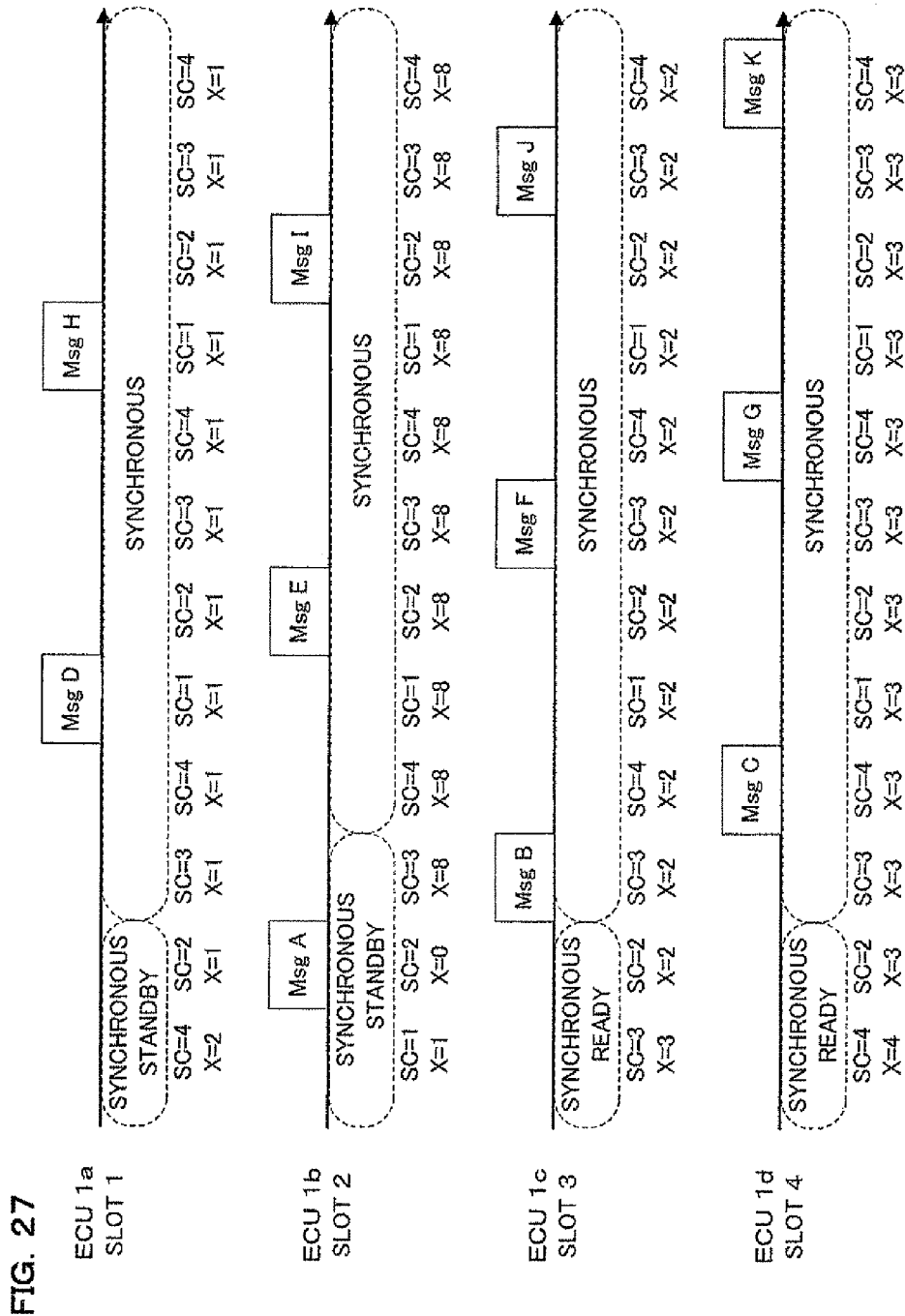
FIG. 27 is a timing chart illustrating a processing example of a start-up sequence.
Figure 28:
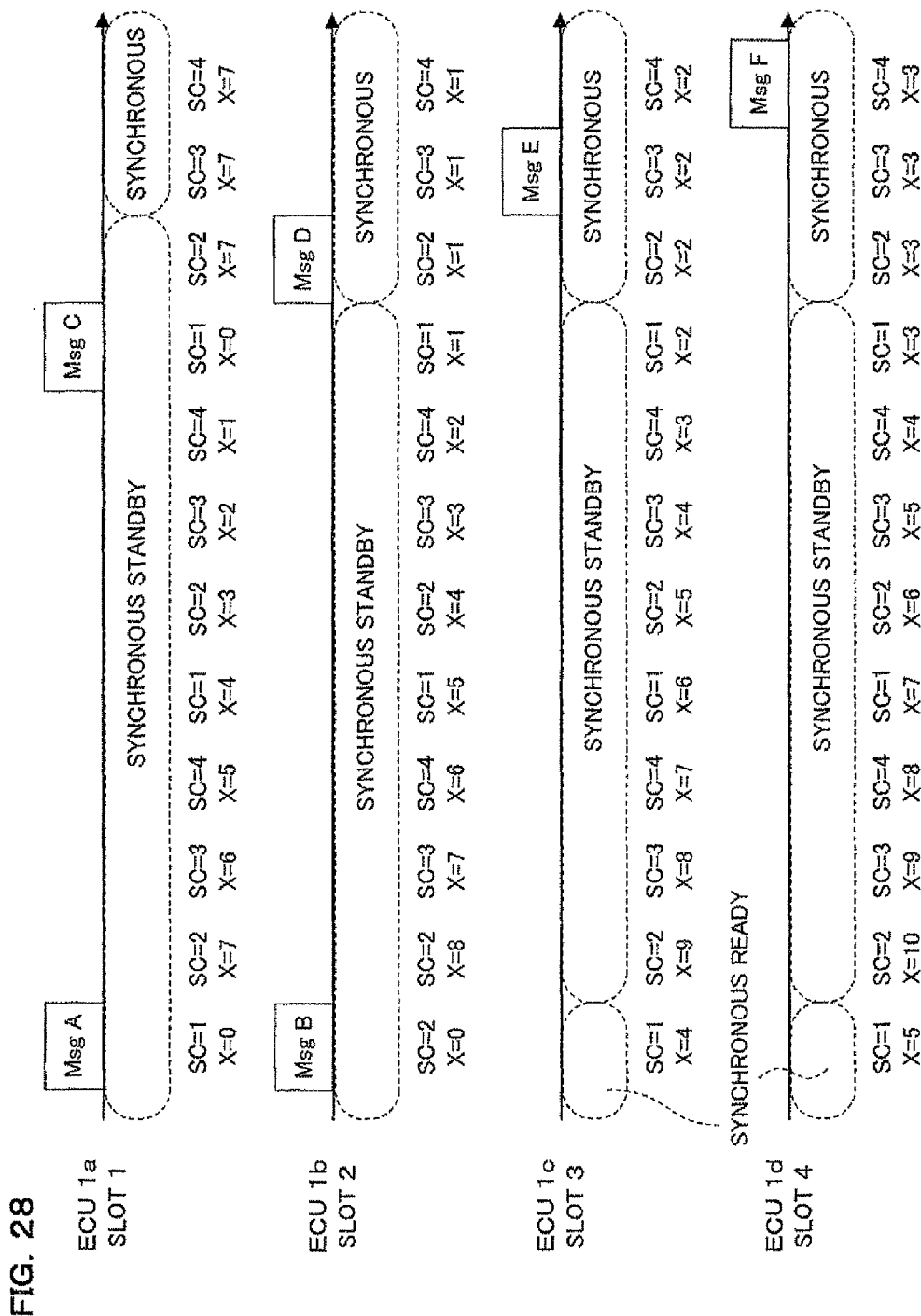
FIG. 28 is a timing chart illustrating the processing example of the start-up sequence.
Figure 29:
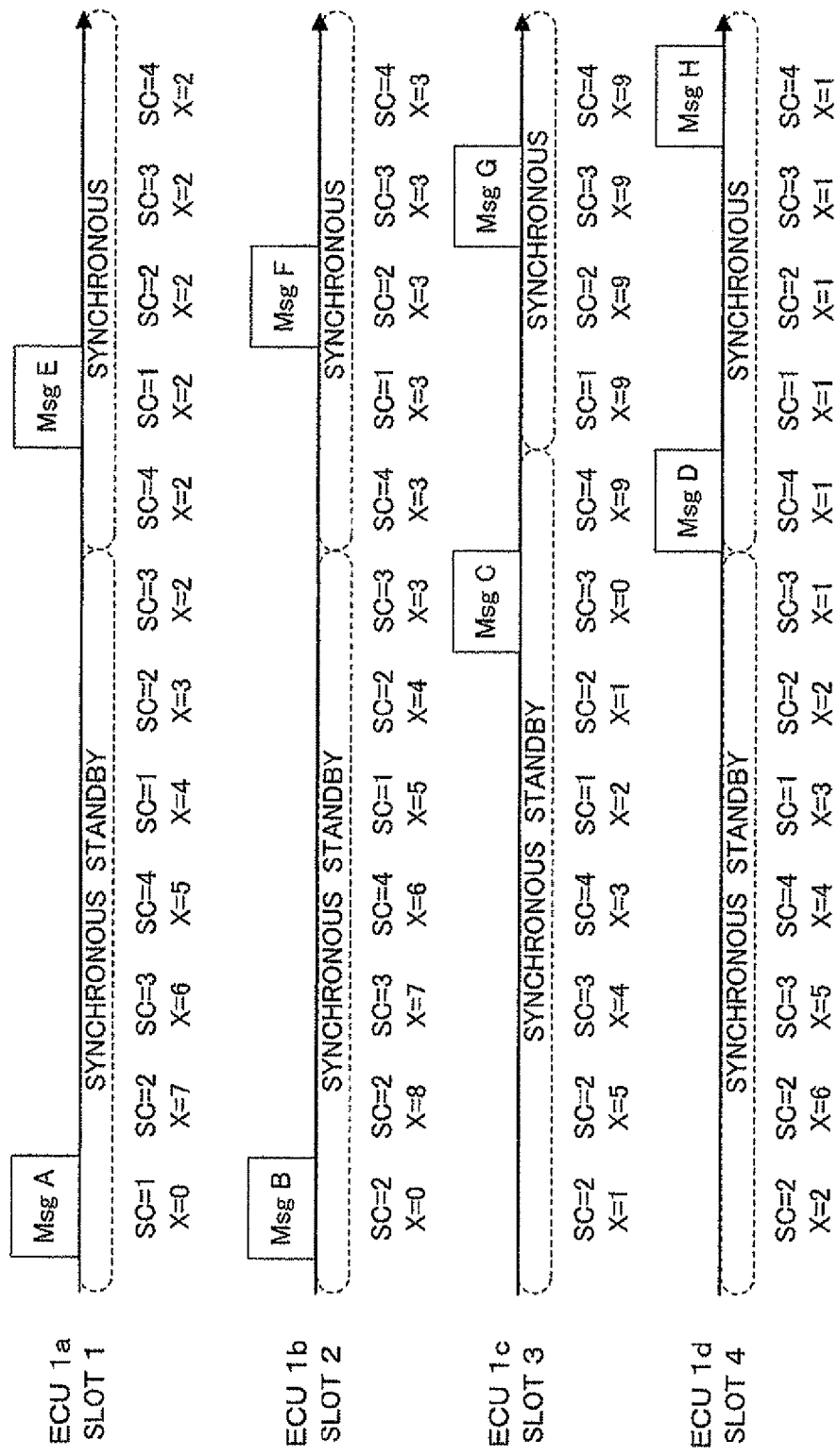
FIG. 29 is a timing chart illustrating the processing example of the start-up sequence.

FIGS. 27 to 29 are timing charts illustrating the processing example of the start-up sequence. Meanwhile, the present example illustrates a start-up sequence in the communication system in which one cycle is configured of four slots and slots 1 to 4 are allocated to the ECUs 1a to 1d, respectively, one by one. Further, in each drawing, the transmitted messages (a rectangle in which a character string of Msg is written), the operation state (an oval of a dotted line), the value (SC=) of the slot counter, and the value (X=) of the counter X are illustrated for the ECUs 1a to 1d, respectively.

FIG. 27 illustrates an example in which the start-up sequence is normally performed. The ECU 1b to which the slot 2 is allocated transmits the message A at the timing at which the counter X=0 in the synchronous standby state. This message A is normally received by other ECUs 1*a*, 1*c* and 1*d*, the slot counters of the ECUs 1*a*, 1*c* and 1*d* are updated in synchronization with the slot number (slot 2) included in the message A, and the ECUs 1*a*, 1*c* and 1*d* transits to the synchronous state.

The ECU 1*c* transmits the message B in the next slot (slot 3) and the ECU 1*b* normally receiving this message B updates the slot counter in synchronization with the slot number (slot 3) included in the message B and transits from the synchronous standby state to the synchronous state. Therefore, all the ECUs 1*a* to 1*d* can cyclically transmit the following messages C to K in the state in which the values of the slot counters are synchronized with one another.

FIG. 28 illustrates an example in which the ECUs 1*a* and 1*b* simultaneously transmit the messages in the start-up sequence and two messages collide with each other on the bus 5. In two ECUs 1*a* and 1*b* in the synchronous standby state, when both of the values of the counters X become zero and the messages A and B are simultaneously transmitted, the ECUs 1*a* and 1*b* transmitting the messages do not check the transmitted messages and therefore, do not know that the messages A and B collide with each other, and set each value of the counters X to (2N+i−2) (that is, the ECU 1*a* set the value of the counter X to 7 and the ECU 1*b* sets the value of the counter X to 8). Further, the ECUs 1*a* and 1*b* transmitting the messages sets the slot counters by regarding the transmitting timing of messages as the slot 1, such that the next slots become the slot 2 together.

Further, the ECUs 1*c* and 1*d* receiving the collided messages A and B in the synchronous ready state respectively determine that the received message is the abnormal message. In this case, the ECUs 1*c* and 1*d* respectively regards the cycle in which the abnormal message is received as the cycle 1 to set the value of the slot counter. Further, the ECUs 1*c* and 1*d* set the values of the counters X to (2N+i−2) (that is, the ECU 1*c* sets the value of the counter X to 9 and the ECU 1*d* sets the value of the counter X to 10) and transits to the synchronous standby state.

As such, four ECUs 1*a* to 1*d* set different value in the counter X according to the allocated slot numbers, such that only the ECU 1*a* of which the value of the counter X becomes zero earliest can transmit the message C. The message C is normally received by other ECUs 1*b* to 1*d* and the ECUs 1*b* to 1*d* synchronize the respective value of the slot counters with the slot number (slot 1) included in the message C and transits to the synchronous state. Next, in the next slot 2, the ECU 1*b* transmits the message D, the message D is normally received by other ECUs 1*a*, 1*c* and 1*d*, and the ECU 1*a*, which is in the synchronous standby state, synchronizes the slot counter with the slot number (slot 2) included in the message D, and transits to the synchronous state.

FIG. 29 illustrates another example in which the ECUs 1*a* and 1*b* simultaneously transmit the messages in the start-up sequence and two messages collide with each other on the bus 5. As shown in above-mentioned FIG. 28, the ECUs 1*a* and 1*b* simultaneously transmitting the messages set the value of the counter X to (2N+i−2) (that is, the ECU 1*a* sets the value of the counter X to 7 and the ECU 1*b* sets the value of the counter X to 8), respectively, and set the slot counter by regarding the transmitting timing of messages as the slot 1.

When the ECUs 1*c* and 1*d* receive the collided messages A and B in the synchronous standby state, the ECUs 1*c* and 1*d* determine that the received message is the abnormal message and set the value of the slot counter by regarding the cycle receiving the message as the cycle 1, and set the value of the counter X to (N+i−2) (that is, the ECU 1*c* sets the value of the counter X to 5 and the ECU 1*d* sets the value of the counter X to 6), respectively.

As such, the ECUs 1*c* and 1*d* receiving the abnormal message set the value of the counter X to (2N+i−2) or (N+i−2) according to the synchronous ready state or the synchronous standby state. That is, when the ECUs 1*c* and 1*d* receive the abnormal message in the synchronous standby state, the ECUs 1*c* and 1*d* set the value of the counter X to a smaller value than the value set in the case where the ECUs 1*c* and 1*d* receive the abnormal message in the synchronous ready state. Therefore, then the value of the counter X of the ECU 1*c* first becomes zero and the ECU 1*c* transmits the message C. The message C is normally received by other ECUs 1*a*, 1*b* and 1*d*, and the ECUs 1*a*, 1*b* and 1*d* synchronize the respective value of the slot counters with the slot number (slot 3) included in the message C and transits to the synchronous state. After that, in the next slot 2, the ECU 1*d* transmits the message D, the message D is normally received by other ECUs 1*a* to 1*c*, and in the synchronous standby state, the ECU 1*c* synchronizes the slot counter with the slot number (slot 4) included in the message D, and transits to the synchronous state.

As described above, even when the collision of the message occurs in the start-up sequence, the counter X is set to different values in each of the ECUs 1*a* to 1*d* of the communication system and the next message transmission starts from the ECUs 1*a* to 1*d* in which the smallest value is set, such that all the ECUs 1*a* to 1*d* can start in synchronization with one another.

<Re-Synchronization Sequence>

Next, some examples of the re-synchronization sequence performed by each ECU 1 in the communication system according to the present invention will be described. In the re-synchronization sequence, the start-up sequence is performed again by the determination of each ECU 1 in the case where ECUs 1 do not synchronize with one another due to any communication problem and the like after each ECU 1 in the communication system ends the start-up sequence to start the synchronized communication. Each ECU 1 transits to the synchronous standby state when each ECU 1 does not normally receive the message from other ECUs 1 from the slot in which each ECU 1 transmits the message to the same slot after two cycles, and performs the re-synchronization.

Figure 30:
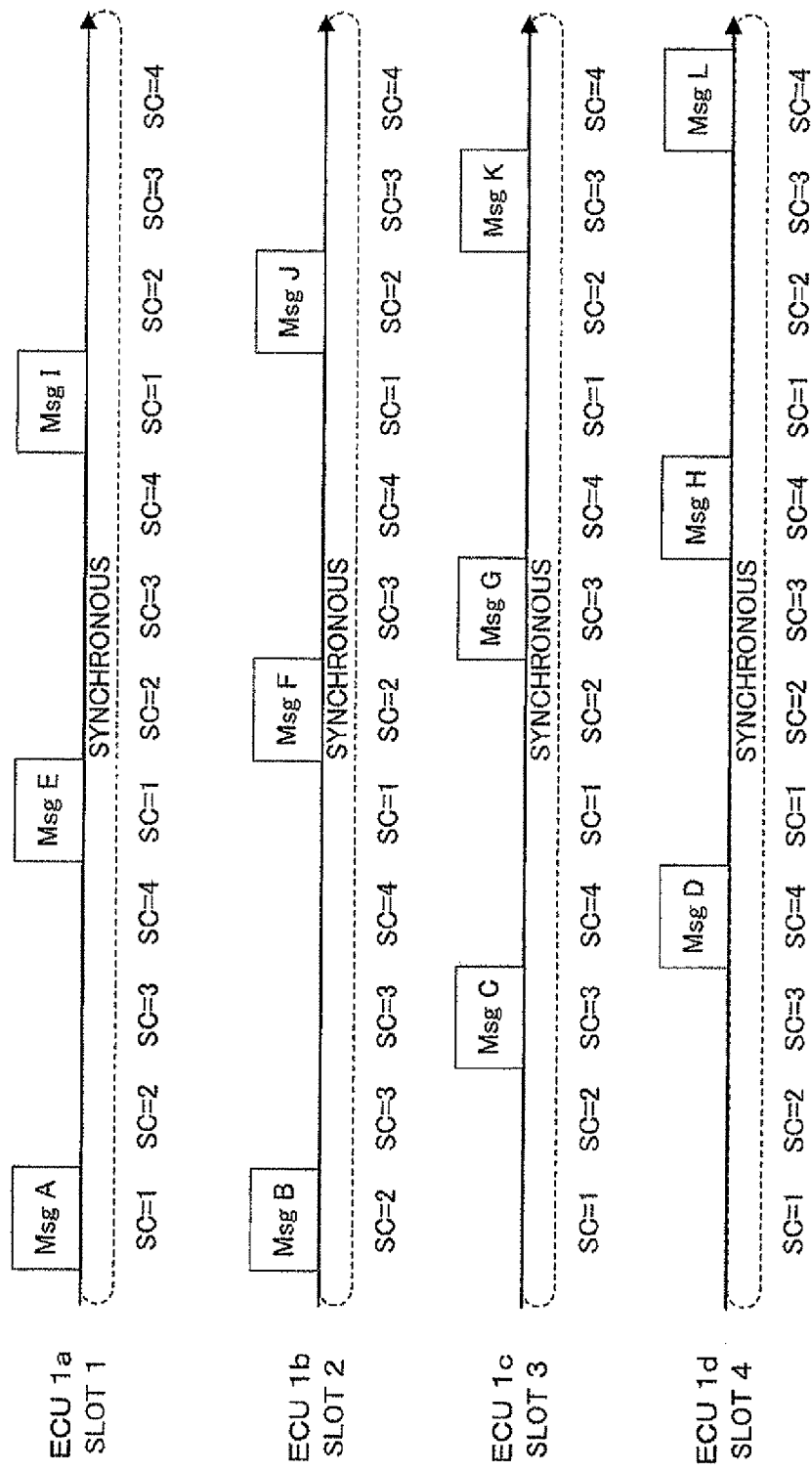
FIG. 30 is a timing chart illustrating a processing example of a re-synchronization sequence.
Figure 31:
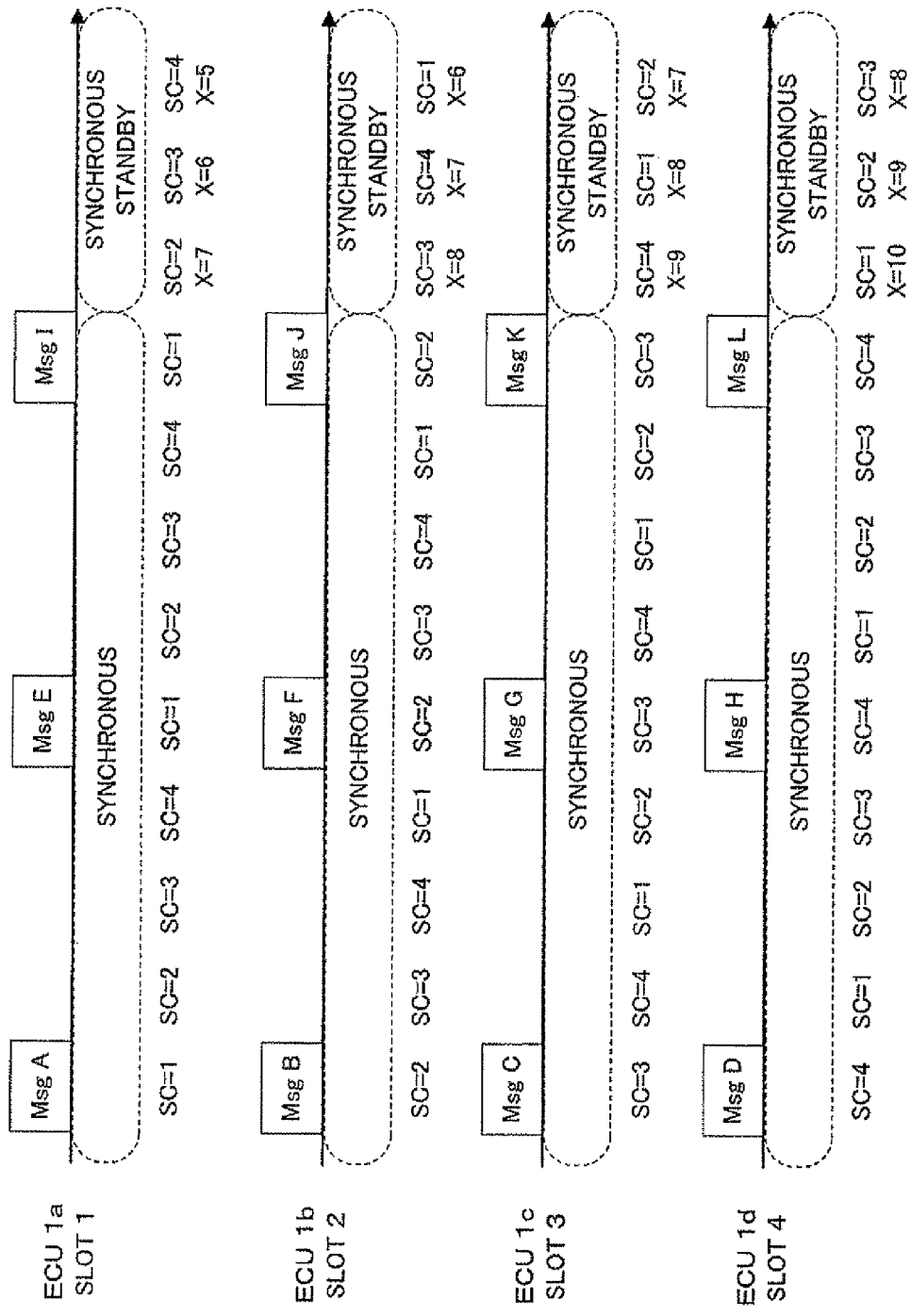
FIG. 31 is a timing chart illustrating the processing example of the re-synchronization sequence.

FIGS. 30 and 31 are timing charts illustrating a processing example of the re-synchronization sequence. Meanwhile, the present example illustrates a re-synchronization sequence in the communication system, similar to FIGS. 27 to 29, in which one cycle is configured of four slots and the slots 1 to 4 are allocated to ECUs 1*a* to 1*d*, respectively, one by one. Further, in each drawing, the transmitting message (a rectangle in which a character string of Msg is written), the operation state (an oval of a dotted line), the value (SC=) of the slot counter, and the value (X=) of the counter X are illustrated for the ECUs 1*a* to 1*d*, respectively. However, the value of the counter X in the case where the ECUs 1*a* to 1*d* are in the synchronous state is not shown.

FIG. 30 illustrates an example of the case where the ECUs 1*a* and 1*b* transmit the messages A and B simultaneously due to the deviation in synchronization between one ECU 1*b* and other ECUs 1*a*, 1*c* and 1*d*. In the case where the ECUs 1*a* and 1*b* transmit the messages A and B simultaneously due to that the slot counter of the ECU 1*b* corresponds to the slot 2 at the timing when the slot counters of the ECUs 1*a*, 1*c* and 1*d* corresponds to the slot 1, other ECUs 1*c* and 1*d* receive the abnormal message. In the next slot, the slot counters of the ECUs 1*a*, 1*c* and 1*d* correspond to the slot 2, but the slot counter of the ECU 1b corresponds to the slot 3, such that the ECU 1b does not transmit the message.

Next, the ECU 1c transmits the message C at the timing when the slot counters of the ECUs 1a, 1c and 1d correspond to the slot 3. Therefore, the ECU 1b normally receiving the message C synchronizes the slot number included in the message C with the slot counter, such that all the ECUs 1a to 1d can return to the synchronized state.

FIG. 31 illustrates an example of the case where all the ECUs 1a to 1d simultaneously transmit the message A to D due to the deviation in synchronizations of all the ECUs 1a to 1d. When all the ECUs 1a to 1d simultaneously transmit the messages A to D, the messages are not transmitted until the all the ECUs 1a to 1d reach the next cycle. After one cycle, all the ECUs 1a to 1d simultaneously transmit the messages E to H. Similarly, after further one cycle, all the ECUs 1a to 1d simultaneously transmit the messages I to L.

When each of the ECUs 1a to 1d do not receive the messages from other ECUs 1a to 1d for the period of two cycles as described above, the ECUs 1a to 1d set the values of the counter X to (2N+i−2) and transit to the synchronous standby state. In this case, the counter X of each of the ECUs 1a to 1d is set to different values according to the allocated slot and the message is transmitted from the ECU 1a in which the smallest value is set in the counter X, such that the slot counters of all the ECUs 1a to 1d can be synchronized with one another, thereby resuming the cyclical message transmission.

The communication system according to the present invention has the configuration of the network in which the plurality of ECUs 1 are connected with the common bus 5. In the communication system according to the present invention, one or more slots (transmission right) are allocated to each ECU 1 in advance and the plurality of ECUs 1 cyclically transmit the messages in the order prescribed in relation to the slots. Therefore, there is no need to perform the arbitration as in the existing CAN protocol, since the plurality of ECUs 1 do not transmit the messages simultaneously. It is possible to achieve the high communication rate.

When each ECU 1 transmits the message related to one slot, the ECUs 1 creates and transmits the message including the data to be transmitted to other ECUs 1, and the information representing the success/failure of the message reception related to other slots. Therefore, the ECU 1 can effectively use the slots allocated thereto to inform other ECUs 1 of the success/failure of the message reception and to provide the data included therein to other ECUs 1.

The message transmitted by one ECU 1 is received by all the other ECUs 1 connected with the bus 5, and the ECU 1 receiving the message can acquire the required data from the data field of the message, and determine from the ACK field of the message, whether or not the message previously transmitted by the ECU is accurately received. Therefore, each ECU 1 can check the information of the ACK filed included in the message received during one cycle from the transmission of one message related to one slot to the next transmission of message related to said one slot. When the message related to said one slot is not accurately received by other ECUs 1, the ECU 1 can retransmit the message in the next transmission related to said one slot.

Therefore, the transmission collision of messages does not occur and the plurality of ECUs 1 can effectively transmit the messages cyclically, and even when the messages are not accurately received due to any problem, the message can be accurately retransmitted.

Further, the message created and transmitted by the ECU 1 includes the success/failure of the message reception related to the slot corresponding to one cycle in the ACK field. Therefore, each communication apparatus checks the ACK fields of the messages received for one cycle, respectively, to inform whether or not its own transmission messages are correctly received by all the other communication apparatuses sharing the bus 5.

When the message is not transmitted for one slot at all, each ECU 1 of the communication system omits the reception processing of the messages related to this slot and perform the processing related to the next slot. Therefore, when the ECU 1 to which this slot is allocated stops the message transmission for any reason, the time in which the message transmission and reception is not performed for the cycle can be maximally reduced and the high communication rate can be achieved.

Further, the message created and transmitted by each ECU 1 includes the information of the slot number so as to identify which of the slots is related to the transmitted message and each ECU 1 synchronizes the communication processing by the slot number of the received message. Therefore, the plurality of ECUs 1 in the communication system can correctly transmit and receive the messages in synchronization with the slots.

Further, each ECU 1 includes the error counters, that is, the TEC and the REC and each ECU 1 counts the occurrence number of errors related to the message transmission and reception. When the occurrence number of errors exceeds the predetermined number, each ECU 1 reduces the frequency of the message transmission to one time in two cycles. Therefore, it is possible to prevent the message transmission of the ECU 1 that is highly likely to be malfunctioning from badly affecting the processing of other ECUs 1 and to improve the reliability of the communication system.

Further, in the start-up sequence performed after the waking up and the like, each ECU 1 consistently receives the message from other ECUs 1 during three cycles immediately after the driving. When each ECU 1 receives the message during three cycles, each ECU 1 starts the processing in synchronization with the slot of the received message. When each ECU 1 does not receive the message during three cycles, each ECU 1 transmits the message (the ACK frame). Therefore, the plurality of ECUs 1 in the communication system are correctly synchronized with one another after the waking up to start the communication processing.

Further, in the start-up sequence, each ECU 1 sets the value of the counter X according to the slot number allocated thereto after the message is transmitted and after the abnormal message is received. When the value of the counter X reaches zero by decrement, each ECU 1 transmits the message. Therefore, the plurality of ECUs 1 in the communication system can set different values in the counter X, respectively, and the ECU 1 to which the smallest value is set can transmit the next message alone and therefore, other ECUs 1 receive the transmitted message to perform the synchronization.

Further, for the problems (the deviation in synchronization) after the start-up sequence is completed to establish the synchronization, when each ECU 1 never receives the message from other ECUs 1 during two cycles, each ECU 1 sets the values of the counter X according to the slot number allocated thereto and performs the re-synchronization by the processing like the start-up sequence. Therefore, even when the deviation in synchronization occurs among the plurality of communication apparatuses due to the problem of communications and the like and the plurality of communication apparatuses transmit the messages simultaneously, the re-synchronization of the plurality of communication apparatuses can be correctly performed.

When the communication system transits to the sleep mode, each ECU 1 transmits and receives, as the sleep request, the ACK frame in which the sleep bit is set as the recessive. When each ECU 1 receives the sleep request for all the slots during one cycle, each ECU 1 stops the message transmission and transits to the sleep mode (the bus sleep state). Therefore, after the agreement on the transition to the sleep mode among all the ECUs 1 connected with the bus 5 is established, each ECU 1 can transit to the sleep mode.

As such, the communication system according to the present invention has substantially the same functions as the functions of the existing CAN protocol and these functions are achieved in the protocol control layer of each ECU 1, such that an application created corresponding to the existing CAN protocol can be used as it is (or an application that is modified to be small can be used). Further, in the communication system according to the present invention, there is no need to perform arbitration as in the existing CAN protocol and there is no need to detect the signal level for each bit at the time of the message transmission. Therefore, the communication protocol of the present invention can remove the impediments in achieving the high communication rate in the existing CAN protocol and achieve the message transmission and reception at higher speed than the existing CAN protocol.

Further, in the present embodiment, the allocation of the slots to each ECU 1 is performed statistically, but the allocation of the slots is not limited to the foregoing manner. The allocation of the slots to each ECU 1 may be performed dynamically at any timing after the communication system wakes up and the like. Further in the present embodiment, the plurality of slots can be allocated to one ECU 1, but the allocation is not limited to the foregoing manner. Only one slot may be allocated to one ECU 1. Further, the communication system of the present invention is not limited to one mounted in a vehicle and may be applied to various systems.

Modified Example

Further, the configuration of the message transmitted and received by the ECU 1 is not limited to the one shown in FIGS. 4A and 4B and may have different configurations, such as the one illustrated the following modified example. FIG. 32 is a schematic view illustrating a message configuration of a communication system according to the modified example. Meanwhile, FIG. 32 illustrates only the configuration of the data frame, and since the configuration of the ACK frame (the configuration other than the data field from the data frame) is the same, the configuration of the ACK frame is not shown.

The data frame of the modified example has a configuration obtained by adding the CRC for the slot number (in FIG. 32, abbreviated to CRC) between the slot number and the data field of the data frame shown in FIG. 4A. Although not shown, in the ACK frame, the CRC for the slot number is added between the slot number and the CRC field of the ACK frame shown in FIG. 4B. The CRC for the slot number is used to detect the error of the slot number included in the received message and is acquired by performing the operation adopting the predetermined generator polynomial for the value of the slot number. The ECU 1 receiving the messages compares the value calculated by the generator polynomial from the slot number included in the received message with the value of the CRC for the slot number of the received message, thereby detecting the error. The ECU 1 determines that the error occurs when two values do not coincide with each other.

As such, the CRC for the slot number for detecting the errors of the slot number is provided in the message transmitted and received by the ECU 1, such that the ECU 1 can further check whether or not the error is included in the slot number when the error are detected on the basis of the CRC field. Therefore, even when each ECU 1 receives the message including the error, each ECU 1 can perform the synchronous processing of communication by slot number of the received message, if the error is not included in the slot number. Accordingly, the plurality of ECUs 1 can smoothly cyclically transmit and receive the messages.

Further, in the foregoing modified example, the CRC for the slot number for detecting the error of the slot number is provided in the message, but the place where the CRC for the slot number is not limited to the foregoing place. The data for correcting the error of the slot number may be provided in the message.

The invention claimed is:

1. A communication system, comprising:
a plurality of communication apparatuses connected with a common communication line,
wherein a message transmitted by one communication apparatus among the plurality of communication apparatuses is received by other communication apparatuses,
wherein one or more transmission rights are allocated to each of the plurality of the communication apparatuses in advance and the plurality of communication apparatuses cyclically transmit messages in an order prescribed in relation to the allocated transmission rights,
wherein each communication apparatus includes:
a message transmitting part creating and transmitting a message including a plurality of success/failure information of reception, each of which represents a success/failure of message reception related to each transmission right, and data to be transmitted to another communication apparatus;
a message retransmitting part retransmitting a message according to the success/failure information of reception included in a message received from another communication apparatus; and
an error counter counting an occurrence number of errors related to message transmission and reception.

2. The communication system according to claim 1,
wherein the message transmitting part of each communication apparatus adds in a message to be transmitted, a success/failure of reception of a message related to another transmission right and transmitted during one cycle from one message transmission related to one transmission right of the message transmitting part to a next message transmission related to said one transmission right as the success/failure information of reception.

3. The communication system according to claim 1,
wherein each communication apparatus transmits or receives, when a message related to one transmission right is not transmitted for a predetermined time, a message related to a next transmission right.

4. The communication system according to claim 1,
wherein the message transmitting part of each communication apparatus creates and transmits a message including identification information for identifying the transmission right,
wherein each communication apparatus synchronizes message transmission and reception on a basis of the identification information of a received message.

5. The communication system according to claim 4,
wherein the message transmitting part of each communication apparatus creates and transmits a message including information for detecting or correcting an error of the identification information.

6. The communication system according to claim 1,
wherein the message transmitting part of each communication apparatus reduces a frequency of message transmission when the occurrence number of errors counted by the error counter exceeds a predetermined value.

7. A communication system, comprising:
a plurality of communication apparatuses connected with a common communication line,
wherein a message transmitted by one communication apparatus among the plurality of communication apparatuses is received by other communication apparatuses,
wherein one or more transmission rights are allocated to each of the plurality of the communication apparatuses in advance and the plurality of communication apparatuses cyclically transmit messages in an order prescribed in relation to the allocated transmission rights,
wherein each communication apparatus does not transmit a message during a predetermined cycle after waking up,
wherein each communication apparatus includes:
 a message transmitting part creating and transmitting a message including a plurality of success/failure information of reception, each of which represents a success/failure of message reception related to each transmission right, and data to be transmitted to another communication apparatus;
 a message retransmitting part retransmitting a message according to the success/failure information of reception included in a message received from another communication apparatus; and
 a communication starting part starting message transmission and reception to and from another communication apparatus by:
  transmitting, when a message is received from another communication apparatus during the predetermined cycle after waking up, a next message in synchronization with the received message; and
  transmitting a message when a message is not received from another communication apparatus during the predetermined cycle after waking up.

8. The communication system according to claim 7,
wherein each communication apparatus includes a time measuring part measuring a standby time up to message transmission,
wherein the communication starting part of each communication apparatus transmits a message after the standby time according to the allocated transmission right is measured by the time measuring part, when the communication starting part transmits a message or when the communication apparatus receives an abnormal message from another communication apparatus during the predetermined cycle,
wherein the plurality of communication apparatuses measure different standby times using the time measuring part, respectively.

9. A communication system, comprising:
a plurality of communication apparatuses connected with a common communication line,
wherein a message transmitted by one communication apparatus among the plurality of communication apparatuses is received by other communication apparatuses,
wherein one or more transmission rights are allocated to each of the plurality of the communication apparatuses in advance and the plurality of communication a apparatuses cyclically transmit messages in an order prescribed in relation to the allocated transmission rights,
wherein each communication apparatus includes:
 a message transmitting part creating and transmitting a message including a plurality of success/failure information of reception, each of which represents a success/failure of message reception related to each transmission right, and data to be transmitted to another communication apparatus;
 a message retransmitting part retransmitting a message according to the success/failure information of reception included in a message received from another communication apparatus;
 a communication stop request transmitting part transmitting a message for requesting a stop of message transmission;
 a communication stop request receiving part receiving a message for requesting a stop of communication processing from another communication apparatus; and
 a communication stop control part stopping message transmission when the communication stop request receiving part receives the message for requesting the stop of the communication processing from other communication apparatuses during a predetermined cycle.

10. A communication apparatus,
wherein the communication apparatus transmits and receives a message to and from another apparatus via a common communication line,
wherein one or more transmission rights are allocated to the communication apparatus in advance,
the communication apparatus comprising:
 a message transmitting part creating and transmitting a message including a plurality of success/failure information of reception, each of which represents a success/failure of message reception related to each of the transmission rights including a transmission right allocated to another communication apparatus, and data to be transmitted to another apparatus;
 a message retransmitting part retransmitting a message according to the success/failure information of reception included in a message received from another apparatus; and
 an error counter counting an occurrence number of errors related to message transmission and reception.

11. A communication system, comprising:
a plurality of communication apparatuses connected with a common communication line,
wherein a message transmitted by one communication apparatus among the plurality of communication apparatuses is received by other communication apparatuses,
wherein one or more transmission rights are allocated to each of the plurality of the communication apparatuses in advance and the plurality of communication apparatuses cyclically transmit messages in an order prescribed in relation to the allocated transmission rights,
wherein each communication apparatus includes:
 a message transmitting part creating and transmitting a message including a plurality of success/failure information of reception, each of which represents a success/failure of message reception related to each transmission right, and data to be transmitted to another communication apparatus;
 a message retransmitting part retransmitting a message according to the success/failure information of reception included in a message received from another communication apparatus;
 a time measuring part measuring a standby time up to message transmission; and a communication resuming part resuming message transmission after the standby time according to the allocated transmission right is measured by the time measuring part when a message is not received from another communication apparatus during a predetermined cycle.

12. The communication system according to claim 11, wherein the plurality of communication apparatuses measure different standby times using the time measuring part, respectively.

* * * * *